US012762984B2

(12) United States Patent
So et al.

(10) Patent No.: US 12,762,984 B2
(45) Date of Patent: Oct. 13, 2026

(54) DISPLAY DEVICE FOR COMPENSATING FOR MURA AND METHOD FOR COMPENSATING FOR MURA

(71) Applicant: LG Display Co., Ltd., Seoul (KR)

(72) Inventors: Byeong Seong So, Paju-si (KR); Do Young Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/919,121

(22) Filed: Oct. 17, 2024

(65) Prior Publication Data

US 2025/0232701 A1 Jul. 17, 2025

(30) Foreign Application Priority Data

Jan. 16, 2024 (KR) ........................ 10-2024-0006462

(51) Int. Cl.

| | |
|---|---|
| ***G09G 3/20*** | (2006.01) |
| ***G09G 3/3233*** | (2016.01) |
| ***G09G 3/3266*** | (2016.01) |

(52) U.S. Cl.

CPC ......... *G09G 3/2007* (2013.01); *G09G 3/3233* (2013.01); *G09G 3/3266* (2013.01); *G09G 2300/0819* (2013.01); *G09G 2300/0852* (2013.01); *G09G 2310/027* (2013.01); *G09G 2310/08* (2013.01); *G09G 2320/0233* (2013.01)

(58) Field of Classification Search

CPC .. G09G 3/2007; G09G 3/3233; G09G 3/3266; G09G 2300/0819; G09G 2300/0852; G09G 2310/027; G09G 2310/08; G09G 2320/0233

See application file for complete search history.

(56) References Cited

U.S. PATENT DOCUMENTS

2018/0190224 A1* 7/2018 Kim ........................ G09G 3/342
2020/0302875 A1* 9/2020 Park ...................... G09G 3/3266
2021/0035504 A1* 2/2021 Lee ....................... G09G 3/3266
2024/0038198 A1* 2/2024 Wang ................... G09G 3/2011

FOREIGN PATENT DOCUMENTS

KR 10-2020-0142818 A 12/2020
KR 10-2023-0083369 A 6/2023

* cited by examiner

*Primary Examiner* — David Tung

(74) *Attorney, Agent, or Firm* — Birch, Stewart, Kolasch & Birch, LLP

(57) ABSTRACT

A display device for compensating for mura and a method for compensating for mura, are discussed. The display device in one example can include a display panel having a plurality of pixel lines disposed in a gate line direction, and a display panel driver configured to write low-grayscale line data on first pixel lines included in a first display area of the display panel. The display panel driver can write high-grayscale line data on second pixel lines included in a second display area of the display panel, and adjust a data writing period of the first pixel lines included in a mura occurrence area through identifying of the mura occurrence area in the first display area.

15 Claims, 31 Drawing Sheets

DISPLAY DEVICE FOR COMPENSATING FOR MURA AND METHOD FOR COMPENSATING FOR MURA

CROSS-REFERENCE TO RELATED APPLICATION

This application claims priority to Korean Patent Application No. 10-2024-0006462, filed in the Republic of Korea on Jan. 16, 2024, the entire contents of which is hereby expressly incorporated by reference into the present application.

BACKGROUND

Field

The present disclosure relates to a display device for compensating for mura and a method for compensating for the mura.

Discussion of the Related Art

Recently, a liquid crystal display (LCD) panel or an organic light-emitting diodes (OLED) panel has been widely used as a display panel.

In case of displaying an image by applying video data with the same luminance and color to all or some pixels of such a display panel, the same luminance and color should be represented across all or some areas of the display panel.

However, due to the internal factors or the like of the display panel, a luminance deviation can occur in a horizontal direction in an image display part of the display panel, and this can cause mura in a stripe form to occur.

Here, the "mura" is a Japanese word corresponding to a stain, and in the display field, it can be commonly called an image deviation for the same grayscale.

Since the picture quality of the display panel deteriorates due to the above-described mura in the stripe form which can be formed, there is a need to improve the picture quality of the display panel by compensating for the mura in the stripe form.

SUMMARY OF THE DISCLOSURE

The present disclosure provides a display device for compensating for mura through adjustment of gate signals of pixel lines included in a display area where the mura occurs, and a method for compensating for mura in a display device.

Another object of the present disclosure is to provide an improved display device and method for compensating for mura or the like, which address limitations and disadvantages associated with the related art.

Objects of the present disclosure are not limited to the above-described objects, and other unmentioned objects will be clearly understood by those skilled in the art from the following description.

An aspect of the present disclosure provides a method for compensating for mura in a display device, which includes: displaying, on a display panel, frame data including high-grayscale line data and low-grayscale line data; identifying a mura occurrence area in a first display area of the display panel on which the low-grayscale line data are displayed; and adjusting and inputting, to first pixel lines, a pulse width of a gate signal that is input to the first pixel lines included in the mura occurrence area in order to compensate for the mura of the mura occurrence area.

According to an aspect of the present disclosure, in the displaying, the display device can display the high-grayscale line data on a second display area that is different from the first display area.

According to an aspect of the present disclosure, the display device can perform pulse width modulation (PWM) driving of the first pixel lines included in the mura occurrence area and second pixel lines included in the second display area, and in the identifying, the mura included in the mura occurrence area can occur due to the PWM driving of the second pixel lines, and can include dark stripes having a luminance value that is smaller than a luminance value of the low-grayscale line data and bright stripes having a luminance value that is larger than the luminance value of the low-grayscale line data.

According to an aspect of the present disclosure, the mura occurrence area can include a dark stripe area on which the mura is displayed with a luminance that is smaller than a luminance value of the low-grayscale line data, a normal area on which the mura is displayed with the same luminance as the luminance value of the low-grayscale line data, and a bright stripe area on which the mura is displayed with a luminance that is larger than the luminance value of the low-grayscale line data.

According to an aspect of the present disclosure, in the inputting, the gate signal can be a gate signal that determines a data writing period of the first pixel lines, and the display device can shorten the pulse width of the gate signal from a reference pulse width, and can input the shortened pulse width of the gate signal to one or more pixel lines included in the dark stripe area.

According to an aspect of the present disclosure, in the inputting, the gate signal can be a gate signal that determines a data writing period of the first pixel lines, and the display device can configure the pulse width of the gate signal to a reference pulse width, and can input the configured pulse width of the gate signal to one or more pixel lines included in the normal area.

According to an aspect of the present disclosure, in the inputting, the gate signal can be a gate signal that determines a data writing period of the first pixel lines, and the display device can extend the pulse width of the gate signal beyond a reference pulse width, and can input the extended pulse width of the gate signal to one or more pixel lines included in the bright stripe area.

In another aspect, the present disclosure provides a display device for compensating for mura, which includes: a display panel including a plurality of pixel lines disposed in a gate line direction; and a display panel driver configured to write low-grayscale line data on first pixel lines included in a first display area of the display panel, write high-grayscale line data on second pixel lines included in a second display area of the display panel, and adjust a data writing period of the first pixel lines included in a mura occurrence area through identifying of the mura occurrence area in the first display area.

According to an aspect of the present disclosure, the display panel driver can adjust and input, to the first pixel lines, a pulse width of a first gate signal that determines a data writing period of the first pixel lines.

According to an aspect of the present disclosure, the display panel driver can include: a gate driving circuit configured to output a plurality of gate signals to the first pixel lines and the second pixel lines, and adjust and output, to the first pixel lines, a pulse width of a first gate signal that determines a data writing period of the first pixel lines; and a data driving circuit configured to write the low-grayscale line data on the respective first pixel lines, and write the high-grayscale line data on the respective second pixel lines.

According to an aspect of the present disclosure, the mura occurrence area can include a dark stripe area on which the mura is displayed with a luminance that is smaller than a luminance value of the low-grayscale line data, a normal area on which the mura is displayed with the same luminance as the luminance value of the low-grayscale line data, and a bright stripe area on which the mura is displayed with a luminance that is larger than the luminance value of the low-grayscale line data.

According to an aspect of the present disclosure, the first pixel line can be included in the dark stripe area, and the gate driving circuit can shorten the pulse width of the first gate signal from a reference pulse width, and can output the shortened pulse width of the first gate signal to the first pixel line.

According to an aspect of the present disclosure, the first pixel line can be included in the bright stripe area, and the gate driving circuit can extend the pulse width of the first gate signal beyond a reference pulse width, and can output the extended pulse width of the first gate signal to the first pixel line.

According to an aspect of the present disclosure, the gate driving circuit can be configured to output a second gate signal for pulse width modulation (PWM) driving to the first pixel lines and the second pixel lines, and the mura included in the mura occurrence area can occur by the PWM driving of the second pixel lines.

According to an aspect of the present disclosure as described above, since the mura is compensated form by adjusting the gate signal of the pixel lines included in the display area where the mura occurs, the picture quality of the display device can be improved.

Various useful advantages and effects of the embodiments are not limited to the above-described contents and will be more easily understood from descriptions of the specific embodiments.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
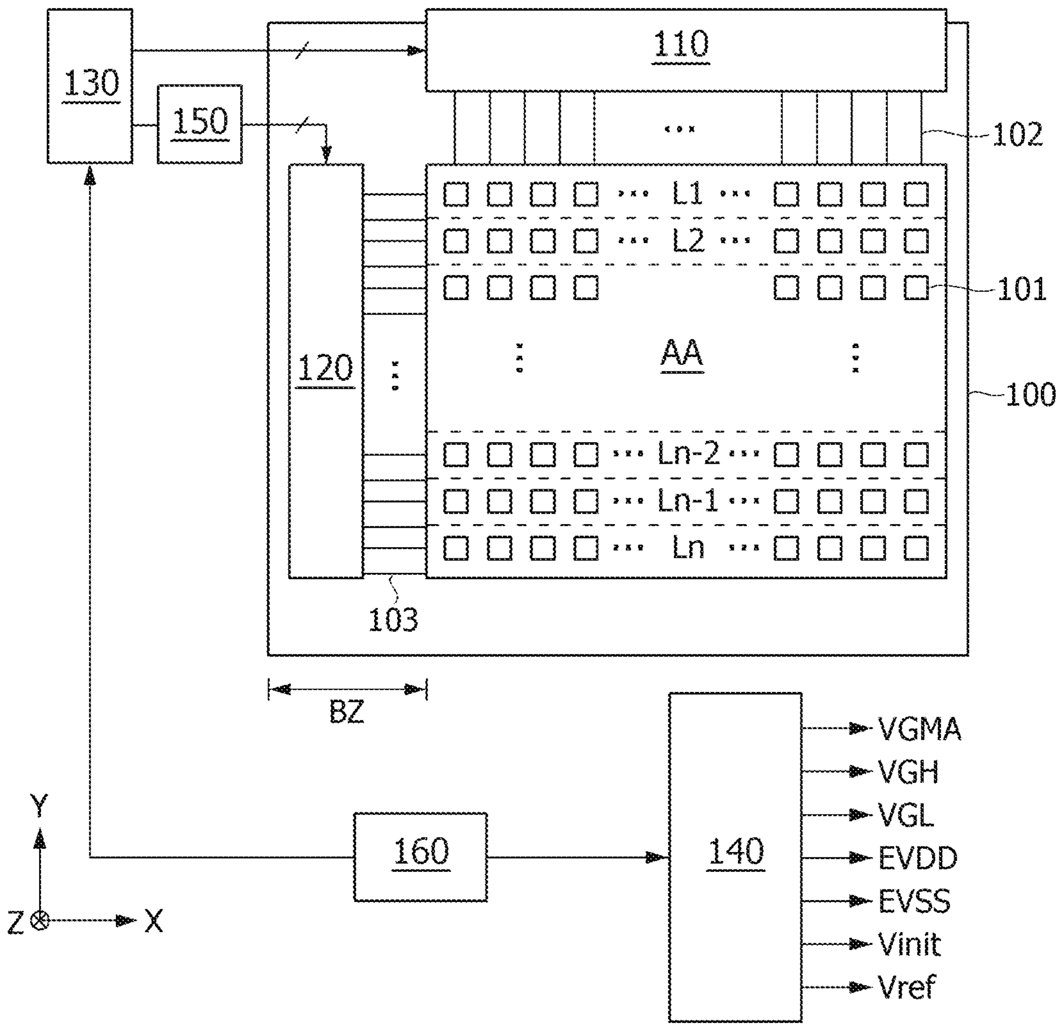
FIG. 1 is a block diagram showing a display device according to a first embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is only defined within the scope of the accompanying claims.

Shapes, sizes, ratios, angles, numbers, and the like disclosed in the drawings for describing the embodiments of the present disclosure are exemplary, and the present disclosure is not limited to the illustrated items. Like reference numerals refer to like elements throughout. In addition, in describing the present disclosure, if it is determined that the detailed description of the related known technology can unnecessarily obscure the subject matter of the present disclosure, the detailed description thereof will be omitted.

The terms such as "comprising," "including," "having," and "consist of" used herein are generally intended to allow other components to be added unless the terms are used with the term "only." Any references to singular can include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple", "crossing or intersecting", and the like, one or more other parts can be interposed therebetween unless the term "immediately" or "directly" is used in the expression. Further, the term "can" fully encompasses all the meanings and coverages of the term "may."

The terms "first," "second," and the like can be used to distinguish components from each other, but the functions or structures of the components are not limited by ordinal numbers or component names in front of the components. Because the claims are written around essential components, the ordinal numbers preceding the component names in the claims may not match the ordinal numbers preceding the component names in the embodiments.

The following embodiments can be partially or entirely bonded to or combined with each other and can be linked and operated in technically various ways. The embodiments can be carried out independently of or in association with each other.

In a display device of the present disclosure, a display panel driver, a pixel circuit, a level shifter, and the like can include transistors. The transistors can be implemented by oxide transistors including oxide semiconductor, low temperature poly silicon (LTPS) transistors including LTPS, and the like. Here, the transistor can be a thin film transistor (TFT).

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons can flow from the source to the drain. In the N-channel transistor, the direction of current flows from the drain to the source. In the case of a P-channel transistor, since the carrier is a hole, the source voltage is higher than the drain voltage so that the hole can flow from the source to the drain. In the P-channel transistor, current flows from the source to the drain because the hole flows from the source to the drain. It should be noted that the source and drain of the transistor are not fixed. For example, the source and drain can be changed according to the applied voltage. Therefore, the invention is not limited due to the source and drain of the transistor. In the following description, a drain and a source of a transistor is called a first electrode and a second electrode.

The scan signal swings between a gate-on voltage and a gate-off voltage. The gate-off voltage can be interpreted as a first voltage, and the gate-on voltage can be interpreted as a second voltage. The transistor is turned on in response to the gate-on voltage, while the transistor is turned off in response to the gate-off voltage. In the case of an N-channel transistor, the gate-on voltage can be a gate high voltage (VGH), and the gate-off voltage can be a gate low voltage (VGL). In the case of a P-channel transistor, the gate-on voltage can be the gate low voltage (VGL), and the gate-off voltage can be the gate high voltage (VGH).

Hereinafter, various embodiments of the present disclosure will be described in detail with reference to the accompanying drawings. All the components of each display device according to all embodiments of the present disclosure are operatively coupled and configured.

Figure 2:
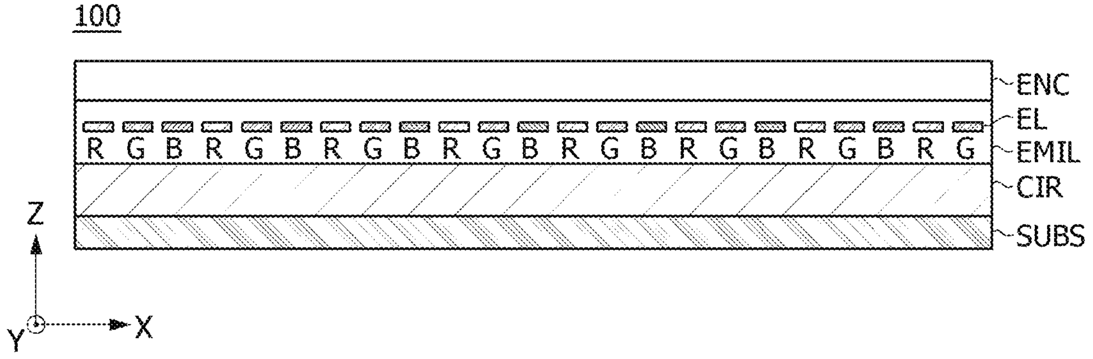
FIG. 2 is a diagram schematically showing a cross-sectional structure of a display panel illustrated in FIG. 1.

FIG. 1 is a block diagram showing a display device according to a first embodiment of the present disclosure. FIG. 2 is a cross-sectional view showing a cross-sectional structure of a display panel illustrated in FIG. 1.

Referring to FIGS. 1 and 2, a display device according to an embodiment of the present disclosure includes a display panel 100, a display panel driver for writing pixel data on pixel circuits of the display panel 100, and a power supply circuit 140 that generates a power required to drive the pixel circuits and the display panel driver. Further, the display device can further include a voltage sensing circuit 160 that measures a pixel driving voltage EVDD output from the power supply circuit 140.

The display panel 100 can be a panel of a rectangular structure having a length in an X-axis direction, a width in a Y-axis direction, and a thickness in a Z-axis direction.

A display area AA (or active area) of the display panel 100 includes a pixel array that displays an image thereon. The pixel array includes a plurality of data lines 102, a plurality of gate lines 103 that cross the plurality of data lines 102, and pixel circuits 101 disposed in a matrix form. The display panel 100 can further include power lines commonly connected to the pixel circuits 101. The power lines are connected to the pixel circuits, and supply the pixel circuits 101 with constant voltages required to drive the pixel circuits 101.

The pixel circuits 101 can be divided into two or more sub-pixel circuits for color implementation. For example, three pixel circuits sequentially arranged in an X-axis direction can be divided into a red sub-pixel circuit, a green sub-pixel circuit, and a blue sub-pixel circuit.

Further, four pixel circuits sequentially arranged in an X-axis direction can be divided into a red sub-pixel circuit, a green sub-pixel circuit, a blue sub-pixel circuit, and a white sub-pixel circuit.

Each of the pixel circuits 101 is connected to the data line, the gate lines, and the power lines.

The pixel array includes a plurality of pixel lines L1 to Ln disposed in a gate line direction. Each of the pixel lines L1 to Ln includes one-line of pixel circuits disposed along a line direction (X-axis direction), for example, along the gate line direction, in the pixel array of the display panel 100. The pixel circuits disposed on one pixel line share the gate lines 103. The pixel circuits disposed in a column direction (Y-axis direction) along a data line direction share the same data lines 102. One horizontal period is time obtained by dividing one frame period by the total number of pixel lines L1 to Ln, where n is a real number such as a positive integer greater than 1.

The display panel 100 can be implemented as a non-transmissive type display panel or a transmissive type display panel. The transmissive type display panel can be applied to a transparent display device in which an image is displayed on a screen and a real thing in the background is seen. The display panel 100 can be implemented as a flexible display panel.

As illustrated in FIG. 2, the cross-sectional structure of the display panel 100 can include a circuit layer CIR, a light-emitting element layer EMIL, and an encapsulation layer ENC, which are stacked on a substrate SUBS.

The circuit layer CIR can include a TFT array including pixel circuits connected to the data lines, gate lines, and power lines, and a gate driving circuit 120. The circuit layer CIR includes a plurality of metal layers insulated from each other with insulation layers interposed therebetween, and a semiconductor material layer. All transistors formed on the circuit layer CIR can be implemented as n-channel oxide TFTs.

The light-emitting element layer EMIL can include a light-emitting element EL that is driven by the pixel circuit. The light-emitting element EL can include a light-emitting element of a red sub-pixel circuit, a light-emitting element of a green sub-pixel circuit, and a light-emitting element of a blue sub-pixel circuit. The light-emitting element layer EMIL can further include a light-emitting element of a white sub-pixel circuit. In each of the sub-pixel circuits, the light-emitting element layer EMIL can have a structure in which the light-emitting elements EL and color filters are stacked on one another. The light-emitting elements EL of the light-emitting element layer EMIL can be covered by a multi protective layer including an organic film and an inorganic film.

The encapsulation layer ENC covers the light-emitting element layer EMIL so as to seal the circuit layer CIR and the light-emitting element layer EMIL. The encapsulation layer ENC can have a multi insulation layer structure in which an organic film and an inorganic film are alternately stacked. The inorganic film blocks the penetration of moisture or oxygen. The organic film planarizes the surface of the inorganic film. If the organic film and the inorganic film are stacked as a multilayer, a movement path of the moisture or oxygen becomes longer than that of a single layer, and thus the penetration of the moisture or oxygen, which exerts an influence on the light-emitting element layer EMIL, can be effectively blocked.

A touch sensor layer, being omitted in FIG. 2, can be formed on the encapsulation layer ENC, and a polarizing plate or a color filter layer can be disposed thereon. The touch sensor layer can include capacitance type touch sensors for sensing a touch input based on a capacitance change before and after the touch input. The touch sensor layer can include metal wiring patterns and insulation films for forming capacitances of the touch sensors. The insulation films can insulate crossing portions of the metal wiring patterns and can planarize the surface of the touch sensor layer. The polarizing plate can improve visibility and a contrast ratio by converting the polarization of an external light that is reflected by metals of the touch sensor layer and the circuit layer. The polarizing plate can be implemented as a polarizing plate in which a linear polarizing plate and a phase delay film are bonded or a circular polarizing plate. A cover glass can be adhered onto the polarizing plate. The color filter layer can include red, green, and blue color filters. The color filter layer can further include a black matrix pattern. The color filter layer can take over a role of the polarizing plate by absorbing a part of the wavelength of light that is reflected from the circuit layer and the touch sensor layer, and can increase the color purity of an image that is reproduced on the pixel array.

The power circuit 140 generates a DC voltage (or constant voltage) required to drive the pixel array of the display panel 100 and the display panel driver by using a DC-DC converter. The DC-DC converter can include a charge pump, a regulator, a buck converter, a boost converter, and the like. The power circuit 140 can generate constant voltages, such as a gamma reference voltage VGMA, a gate-on voltage VGH, a gate-off voltage VGL, a pixel driving voltage EVDD, a cathode voltage EVSS, an initialization voltage Vinit, and a reference voltage Vref, by adjusting levels of the DC input voltage that is applied from a host system. The gamma reference voltage VGMA is supplied to the data driving circuit 110. The gate-on voltage VGH and the gate-off voltage VGL are supplied to a level shifter 150 and a gate driving circuit 120. The constant voltages such as the pixel driving voltage EVDD, the cathode voltage EVSS, the initialization voltage Vinit, and the reference voltage Vref are supplied to the pixel circuits 101 through power lines commonly connected to the pixel circuits 101.

Meanwhile, the pixel driving voltage EVDD can be output from a main power of a host system, and can be supplied to the display panel 100. In this case, the power circuit 140 does not need to output the pixel driving voltage EVDD.

The display panel driver writes pixel data of an input image in the pixel circuits of the display panel 100 under the control of a timing controller 130.

The display panel driver includes a data driving circuit 110 and a gate driving circuit 120.

Further, the display panel driver can further include a touch sensor driving circuit for driving touch sensors. The data driving circuit 110 and the touch sensor driving circuit can be integrated into one drive integrated circuit (IC). In a mobile device or a wearable device, the timing controller 130, the power circuit 140, the level shifter 160, the data driving circuit 110, and the touch sensor driving circuit can be integrated into one drive IC.

The data driving circuit 110 receives the pixel data of the input image that is received from the timing controller 130 as a digital signal, and outputs a data voltage Vdata. The data driving circuit 110 converts the pixel data of the input image into a gamma compensation voltage for each frame period by using a digital to analog converter (DAC), and outputs the data voltage Vdata. The gamma reference voltage VGMA is divided into a gamma compensation voltage for each gradation through a voltage divider circuit. The gamma compensation voltage for each gradation is provided to the DAC of the data driving circuit 110. The data voltage Vdata is output on each of channels of the data driving circuit 110 through an output buffer.

The data driving circuit 110 can be integrated into a source driver integrated circuit (SDIC). The source driver IC can be connected to a bonding pad of the display panel 100 in a tape automated bonding (TAB) method or a chip on glass (COG) method. Further, the source driver IC can be implemented in a chip on film (COF) method.

The gate driving circuit 120 can be formed on the circuit layer CIR of the display panel 100 together with the TFT array and wirings of the pixel array. The gate driving circuit 120 can be disposed on a bezel (BZ) area that is a non-display area of the display panel 100, or can be dispersedly disposed in the pixel array on which an input image is reproduced. NA where an image is not displayed in the display panel 100. Here, the non-display area NA can be a bezel area.

The gate driving circuit 120 can be disposed on both sides of the bezel area of the display panel 100 with the display area AA of the display panel interposed therebetween, and can supply gate pulses on both sides of gate lines 103 in a double feeding method. In another embodiment, the gate driving circuit 120 can be disposed on either side of left and right bezels of the display panel 100, and can supply the gate signals to the gate lines 103 in a single feeding method. The gate driving circuit 120 sequentially outputs the pulses of the gate signals to the gate lines under the control of the timing controller 130. The gate driving circuit 120 can sequentially supply the signals to the gate lines 103 by shifting the pulse of the gate signal by using a shift register.

The gate driving circuit 120 can include a plurality of shift registers which output the pulses of the gate signals. In case of the pixel circuit 101 as in FIG. 3, the gate driving circuit 120 can include a first shift register that sequentially outputs a first gate signal SCAN1, a second shift register that sequentially outputs a second gate signal SCAN2, a third shift register that sequentially outputs a third gate signal SCAN3, a fourth shift register that sequentially outputs a fourth gate signal EM1, and a fifth shift register that sequentially outputs a fifth gate signal EM2.

The timing controller 130 receives video data and a timing signal synchronized with the video data from a host system. The video data received by the timing controller 130 is a digital signal. The timing controller 130 can convert the video data to suit a data format that is used in the data driving circuit 110, and can transmit the converted video data to the data driving circuit 110. Here, the timing signal can include a vertical synchronization signal, a horizontal synchronization signal, a clock signal, and a data enable signal. Since a vertical period and a horizontal period can be known through a method for counting a data enable signal, the vertical synchronization signal and the horizontal synchronization signal can be omitted. The data enable signal has a cycle of one horizontal period (1H).

The timing controller 130 can generate a data timing control signal for controlling an operation timing of the data driving circuit 110, a gate timing control signal for controlling an operation timing of the gate driving circuit 120, and the like based on the timing signal received from the host system.

The gate timing control signal generated from the timing controller 130 can be input to the shift register of the gate driving circuit 120 through a level shifter 150. The level shifter 150 can receive the gate timing control signal, and can generate and provide a start pulse and a shift clock to the gate driving circuit 120.

As described above, the display device including the display panel 100, the display panel driver, and the power supply circuit 140 can be a display device that compensates for the mura by adjusting the gate signals of the pixel lines included in the display area where the mura in a stripe form occurs. Due to this, the display device can improve the picture quality.

Hereinafter, a configuration in which the mura in the stripe form occurs in the display device will be described.

Figure 3:
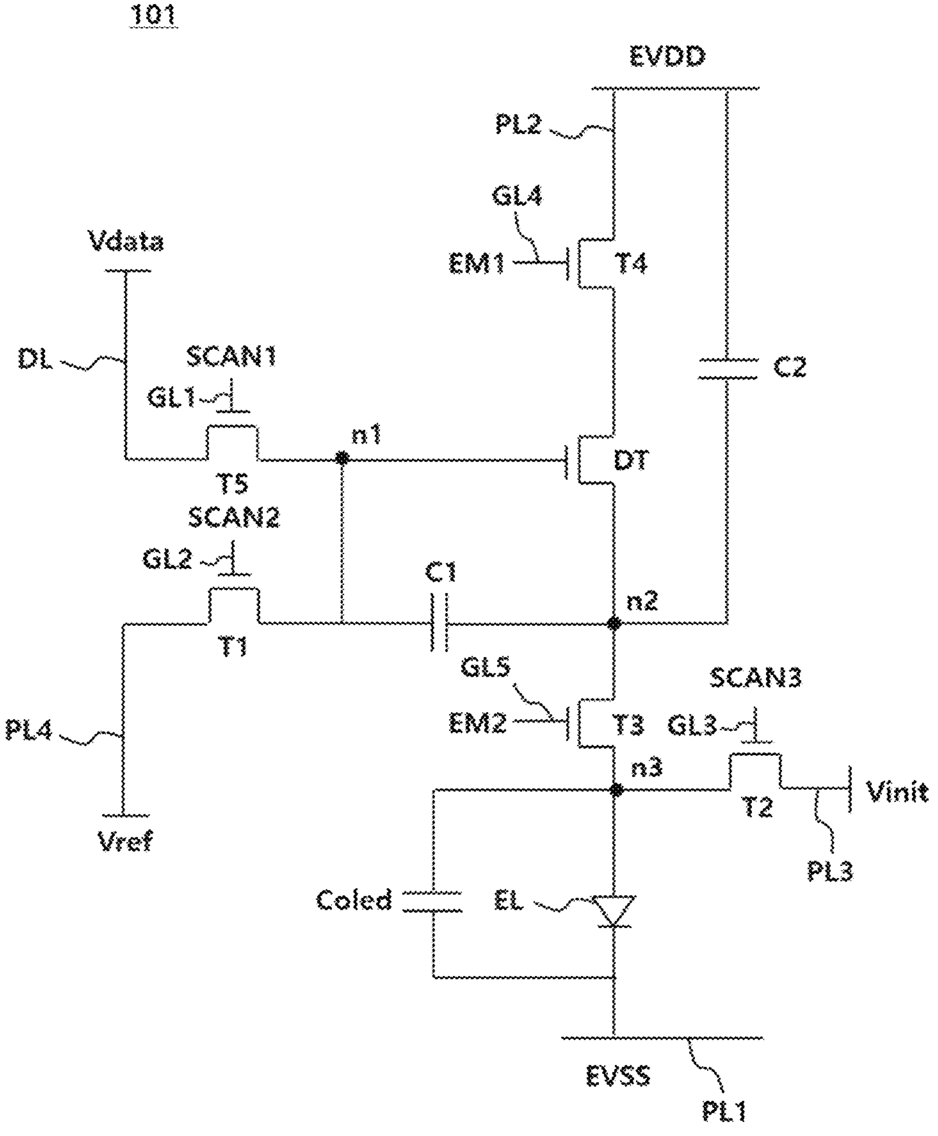
FIG. 3 is a diagram exemplarily illustrating the configuration of a pixel circuit according to the first embodiment of the present disclosure.

FIG. 3 is a circuit diagram exemplarily illustrating a pixel circuit according to the first embodiment of the present disclosure.

Referring to FIG. 3, a pixel circuit 101 can include a light-emitting element EL, a driving element DT that drives the light-emitting element EL, a first capacitor C1, a second capacitor C2, and a plurality of switch elements T1 to T5. Here, the driving element DT and the plurality of switch elements T1 to T5 can be N-channel transistors. Further, the N-channel transistor can be implemented as an oxide TFT.

The pixel circuit 101 is connected to a data line DL to which a data voltage Vdata is applied and gate lines GL1 to GL5 to which gate signals SCAN1, SCAN2, SCAN3, EM1, and EM2 are applied.

The pixel circuit 101 is connected to a first power line PL1 that supplies a cathode voltage EVSS, a second power line PL2 that supplies a pixel driving voltage EVDD, a third power line PL3 that supplies an initialization voltage Vinit, and a fourth power line PL4 that supplies a reference voltage Vref. On the display panel 100, the power lines PL1, PL2, PL3, and PL4 can be commonly connected to all pixels.

The pixel driving voltage EVDD is configured to a voltage which is higher than the maximum voltage of the data voltage Vdata (Vdata white max) and at which the driving element DT can operate in a saturation area. The initialization voltage Vinit can be configured to a voltage which is lower than the cathode voltage EVSS. The reference Vref can be configured to a voltage which is higher than the cathode voltage EVSS and which is lower than the pixel driving voltage EVDD.

A gate-on voltage VGH can be configured to a voltage that is higher than the pixel driving voltage EVDD, and a gate-off voltage VGL can be configured to a voltage that is lower than the cathode voltage EVSS.

For example, if the maximum voltage of the data voltage Vdata (Vdata white max) is 12 [V], and the cathode voltage EVSS is 3 [V], the pixel driving voltage EVDD can be configured within a voltage range of 12.1 [V] to 16 [V]. The initialization voltage Vinit can be configured within a voltage range of 0 [V] to 2.9 [V], and the reference voltage Vref can be configured within a voltage range of 3.1 [V] to 15.9 [V].

The gate-on voltage VGH can be configured within a voltage range of 16.1 [V] to 24 [V], and the gate-off voltage VGL can be configured within a voltage range of 2.9 [V] to −16 [V].

The gate signals SCAN1, SCAN2, SCAN3, EM1, and EM2 include swing pulses between the gate-on voltage VGH and the gate-off voltage VGL. The gate signals SCAN1, SCAN2, SCAN3, EM1, and EM2 include the first gate signal SCAN1, the second gate signal SCAN2, the third gate signal SCAN3, the fourth gate signal EM1, and the fifth gate signal EM2.

Figure 4:
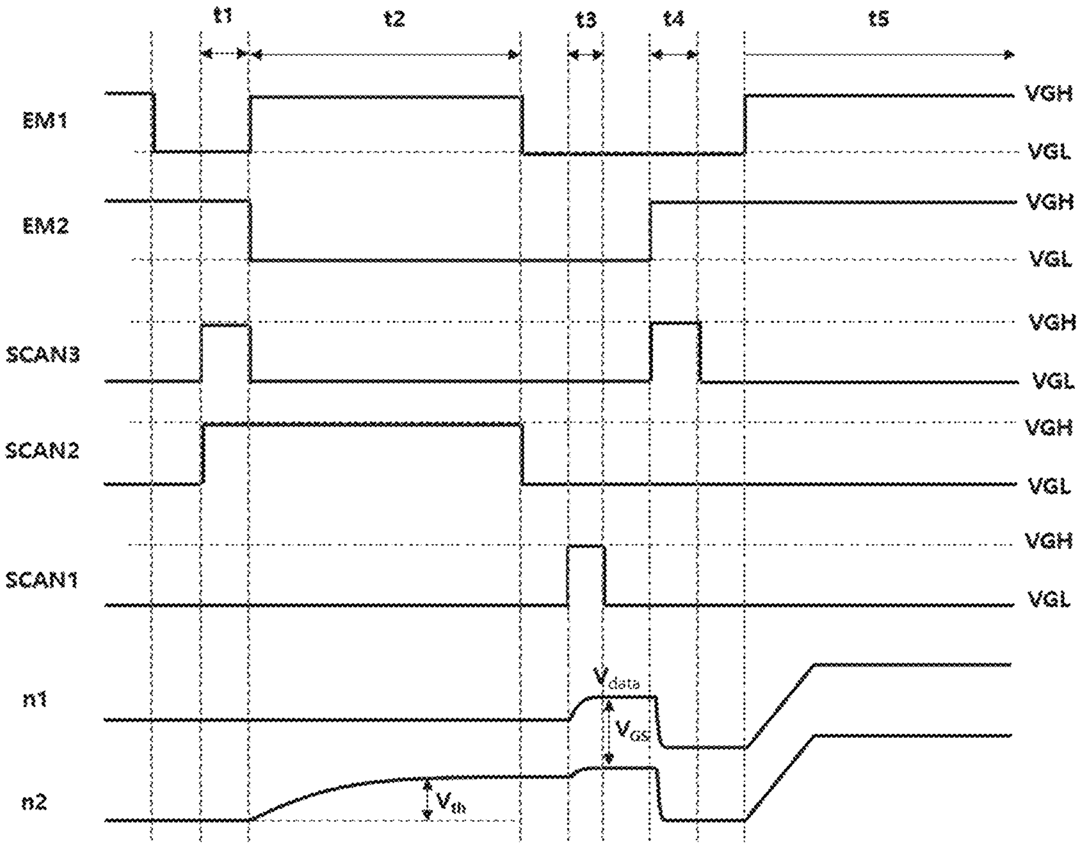
FIG. 4 is a diagram showing waveforms of a gate signal and a node voltage being applied to a pixel circuit illustrated in FIG. 3.

The driving periods of the pixel circuit 101 can be driven in the order of an initialization period t1, a threshold voltage sensing period t2, a data writing period t3, an anode reset period t4, and an emission period t5. As illustrated in FIG. 4, the initialization period t1, the threshold voltage sensing period t2, the data writing period t3, the anode reset period t4, and the emission period t5 can be determined by pulse widths of the gate signals SCAN1, SCAN2, SCAN3, EM1, and EM2.

Specifically, in the initialization period t1, the voltages of the third gate signal SCAN3, the second gate signal SCAN2, and the fifth gate signal EM2 are the gate-on voltages VGH. Further, the voltages of the first gate signal SCAN1 and the fourth gate signal EM1 are the gate-off voltages VGL.

In the threshold voltage sensing period t2, the voltages of the second gate signal SCAN2 and the fourth gate signal EM1 are the gate-on voltages VGH. Further, the voltages of the first gate signal SCAN1, the third gate signal SCAN3, and the fifth gate signal EM2 are the gate-off voltages VGL.

In the data writing period t3, the voltage of the first gate signal SCAN1 is the gate-on voltage VGH. Further, the voltages of the second gate signal SCAN2, the third gate signal SCAN3, the fourth gate signal EM1, and the fifth gate signal EM2 are the gate-off voltages VGL.

In the anode reset period t4, the voltages of the third gate signal SCAN3 and the fifth gate signal EM2 are the gate-on voltages VGH. Further, the voltages of the first gate signal SCAN1, the second gate signal SCAN2, and the fourth gate signal EM1 are the gate-off voltages VGL.

In the emission period t5, the voltages of the fourth gate signal EM1 and the fifth gate signal EM2 are the gate-on voltages VGH. Further, the voltages of the first gate signal SCAN1, the second gate signal SCAN2, and the third gate signal SCAN3 are the gate-off voltages VGL.

Meanwhile, the driving element DT of the pixel circuit 101 drives the light-emitting element EL by generating a current in accordance with a gate-source voltage VGS. The driving element DT includes a gate electrode connected to a first node n1, a first electrode connected to the fourth switch element T4, and a second electrode connected to a second node n2. Here, the pixel driving voltage EVDD can be applied to the first electrode, and the data voltage Vdata can be applied to the first node n1. Specifically, the pixel driving voltage EVDD can be applied to the first electrode in the initialization period t1 and the emission period t5, and the data voltage Vdata can be applied to the first node n1 in the data writing period t3.

The light-emitting element EL can be implemented as an OLED. The light-emitting element EL includes the anode electrode and the cathode electrode, and emits light by the current from the driving element DT. Here, the light-emitting element EL can further include an organic compound layer formed between the anode electrode and the cathode electrode.

The anode electrode of the light-emitting element EL is connected to a third node n3, and the cathode electrode thereof is connected to the first power line PL1 that supplies the cathode voltage EVSS. Here, the third node n3 can be selectively connected to the second node n2 by the turn-on and turn-off of the third switch element T3.

The organic compound layer can include a hole injection layer HIL, a hole transport layer HTL, a light emission layer EML, an electron transport layer ETL, and an electron injection layer EIL, but is not limited thereto. If the voltage is applied to the anode electrode and the cathode electrode of the light-emitting element EL, holes having passed through the hole transport layer HTL and electrons having passed through the electron transport layer ETL move to the light emission layer EML, resulting in that excitons are formed. In this case, visible light is emitted from the light emission layer EML. The light-emitting element EL can be implemented as a tandem structure in which a plurality of light emission layers are stacked. The light-emitting element EL having the tandem structure can improve the luminance and lifetime of the pixels.

The first capacitor C1 is connected between the first node n1 and the second node n2, and stores a threshold voltage Vth of the driving element DT having been sampled during the sampling period t2, and maintains the gate-source voltage VGS of the driving element DT during the emission period t5.

The second capacitor C2 is connected between the second power line PL2 that supplies the pixel driving voltage EVDD and the second node n2.

Meanwhile, the switch elements T1 to T5 of the pixel circuit 101 include the first switch element T1 that is turned on in response to the gate-on voltage VGH of the second gate signal SCAN2, the second switch element T2 that is turned on in response to the gate-on voltage VGH of the third gate signal SCAN3, the third switch element T3 that is turned on in response to the gate-on voltage VGH of the fifth gate signal EM2, the fourth switch element T4 that is turned on in response to the gate-on voltage VGH of the fourth gate signal EM1, and the fifth switch element T5 that is turned on in response to the gate-on voltage VGH of the first gate signal SCAN1.

The first switch element T1 is connected between the fourth power line PL4 that supplies a reference voltage Vref and the first node n1.

The first switch element T1 electrically connects the fourth power line PL4 and the first node n1 to each other in response to the second gate signal SCAN2.

In other words, the first switch element T1 is turned on in response to the gate-on voltage VGH of the second gate signal SCAN2, and applies the reference voltage Vref to the first node n1.

The second switch element T2 is connected between the third power line PL3 that supplies the initialization voltage Vinit and the third node n3.

The second switch element T2 is turned on in response to the gate-on voltage VGH of the third gate signal SCAN3, and applies the initialization voltage Vinit to the third node n3.

The third switch element T3 is connected between the second node n2 and the third node n3.

The third switch element T3 is turned on in response to the gate-on voltage VGH of the fifth gate signal EM5, and electrically connects the second node n2 and the third node n3 to each other.

The fourth switch element T4 is connected between the second power line PL2 that supplies the pixel driving voltage EVDD and the first electrode of the driving element DT.

The fourth switch element T4 is turned on in response to the gate-on voltage VGH of the fourth gate signal EM1, and electrically connects the second power line PL2 and the first electrode of the driving element DT.

The fifth switch element T5 is connected between the data line DL and the first node n1.

The fifth switch element T5 is turned on in response to the gate-on voltage VGH of the first gate signal SCAN1, and applies the data voltage Vdata to the first node n1.

Through the above pixel circuit 101, a plurality of pixel lines can be formed on the display panel 100. Further, the display panel driver can write pieces of line data that constitute one piece of frame data on the plurality of pixel lines. Here, one piece of frame data corresponds to an image of one frame that is displayed on the display panel 100 in one frame period.

Meanwhile, in the first embodiment of the present disclosure, the display panel driver can write low-grayscale line data that is the line data having a low luminance value on all over the pixel lines. In this case, a low-grayscale pattern LGP as in FIG. 6 can be displayed on the display area AA of the display panel 100. Here, the grayscale value and the luminance value can be in proportion to each other, and a low grayscale can mean a grayscale that is equal to or smaller than 63 G in a gamma curve on which the maximum grayscale is 255 G as in FIG. 5.

In other words, the low-grayscale line data can mean the line data having the grayscale value that is equal to or smaller than 63 G.

Figure 5:
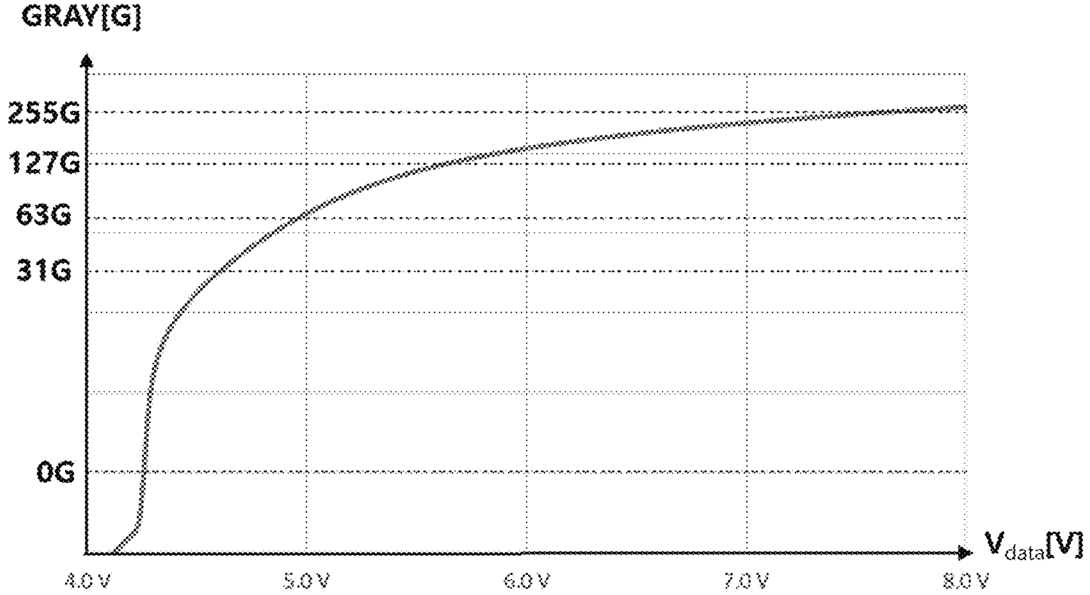
FIG. 5 is a diagram explaining the characteristic of a gamma curve.
Figure 6:
FIG. 6 is a diagram exemplarily illustrating a screen on which a low-grayscale pattern is displayed on a display area of a display device.

Since a gamma curve corresponding to the low-grayscale line data is very steep as in FIG. 5, the pixel circuits 101, for example, the plurality of pixel lines, are unable to accurately display the low-grayscale line data in a normal driving method in which the fourth switch element T4 and the fifth switch element T5 are continuously turned on in the emission period t5 of the pixel circuit 101.

In order to solve this, the display panel driver applies a pulse width modulation (PWM) driving method in which the light emission is temporarily turned off in the emission period t5 of the pixel circuits 101 which constitute one pixel line.

Figure 7:
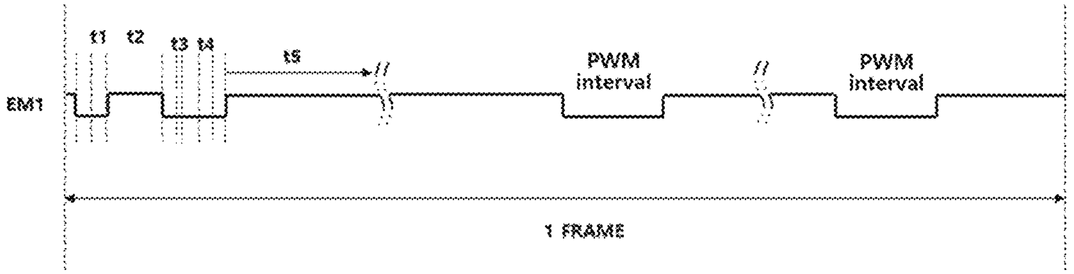
FIG. 7 is a diagram explaining a configuration in which a display device performs PWM driving of a light-emitting element.

In other words, as in FIG. 7, the display panel driver can repeat a temporal turn-off operation of the pixel line by temporarily changing the fourth gate signal EM1 to the gate-off voltage VGL in the emission period t5 of one frame (1 FRAME). Here, the fourth gate signal EM1 for the PWM driving is output by the gate driving circuit 120 included in the display panel driver, and the low-grayscale line data is output by the data driving circuit 110 included in the display panel driver. Accordingly, the gate driving circuit 120 can temporarily change the fourth gate signal EM1 to the gate-off voltage VGL. In the first embodiment of the present disclosure, a period in which the fourth gate signal EM1 is temporarily changed to the gate-off voltage VGL can be defined as a PWM interval.

Figure 8:
FIG. 8 is a diagram exemplarily illustrating a screen on which a high-grayscale pattern and a low-grayscale pattern are displayed together on a display area of a display device.

Meanwhile, in the first embodiment of the present disclosure, the display panel driver can write the low-grayscale line data and the high-grayscale line data being the line data having a high luminance value on the plurality of pixel lines. In this case, on the display area AA of the display panel, as in FIG. 8, the low-grayscale line data and the high-grayscale line data can be displayed together. In other words, a low-grayscale pattern LGP and a high-grayscale pattern HGP can be displayed together. Here, the high grayscale can mean a grayscale that is larger than 63 G. Further, hereinafter, an area on which the low-grayscale line data are displayed in the display area AA is called a first display area, and an area on which the high-grayscale line data are displayed in the display area AA is called a second display area. Further, pixel lines included in the first display area are called first pixel lines, and pixel lines included in the second display area are called second pixel lines.

As described above, in case that the display panel driver writes the low-grayscale line data and the high-grayscale line data on the plurality of pixel lines, it can apply the PWM driving method for all the plurality of pixel lines in order to accurately display the low-grayscale line data.

Figure 9:
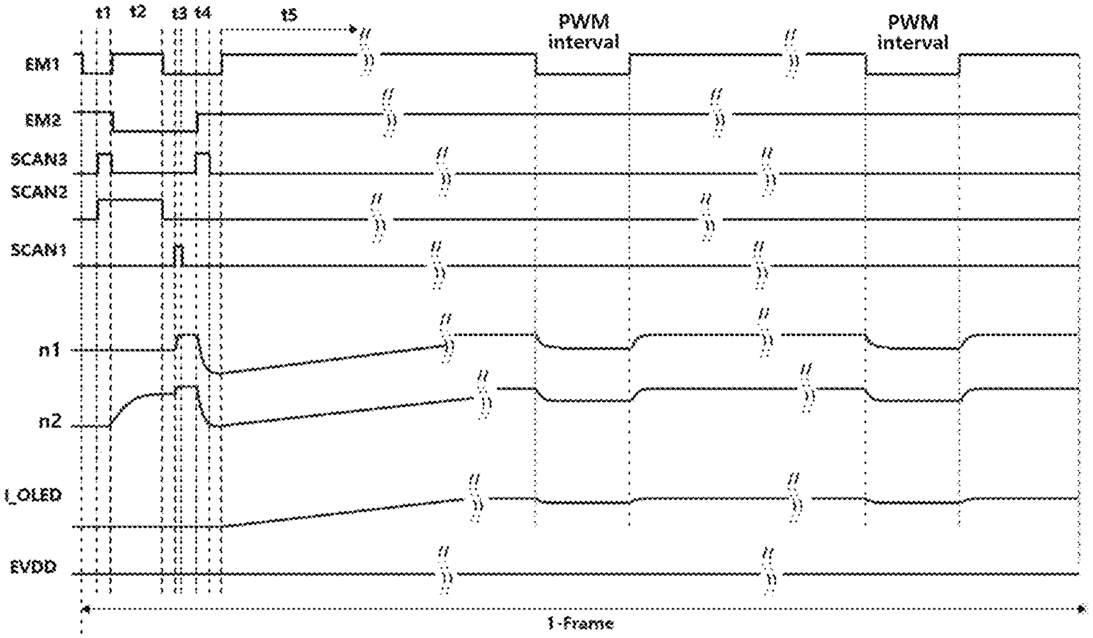
FIG. 9 is a diagram explaining PWM driving of a pixel line on which low-grayscale line data is written on a display area of a display device.
Figure 10:
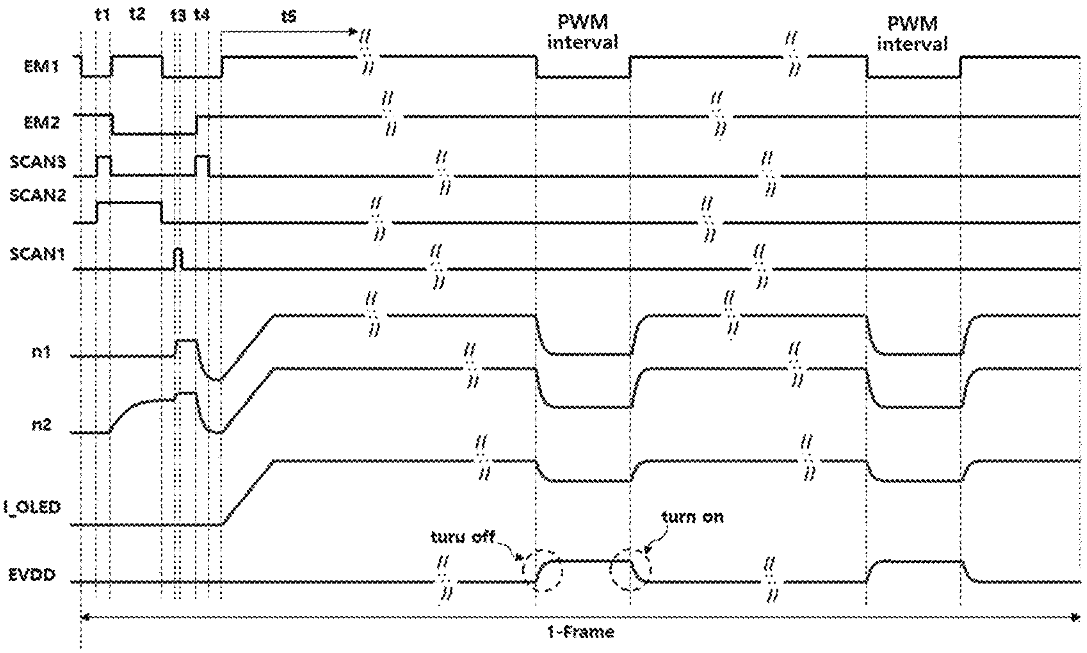
FIG. 10 is a diagram explaining PWM driving of a pixel line on which high-grayscale line data is written on a display area of a display device.

FIG. 9 is a diagram explaining PWM driving of a pixel line on which low-grayscale line data is written on a display area of a display device, and FIG. 10 is a diagram explaining PWM driving of a pixel line on which high-grayscale line data is written on a display area of a display device.

Referring to FIG. 9, in the PWM driving of a pixel line on which the low-grayscale line data is written, for example, a first pixel line, the change of current (I_OLED) that flows to the light-emitting element EL is very small during the PWM interval in which the first pixel line is temporarily turned off, and thus the pixel driving voltage EVDD is constantly maintained.

However, as in FIG. 10, in the PWM driving of a pixel line on which the high-grayscale line data is written, for example, a second pixel line, the current (I_OLED) that flows to the light-emitting element EL decreases and then increases during the PWM interval in which the second pixel line is temporarily turned off. Here, the current (I_OLED) that flows to the light-emitting element EL and the pixel driving voltage EVDD are inversely proportional to each other. Accordingly, during the PWM interval of the second pixel line, the pixel driving voltage EVDD increases and then decreases.

Specifically, the pixel driving voltage EVDD increases at a start point (turn-off) when the PWM interval of the second pixel line starts, and decreases at an end point (turn-on) when the PWM interval of the second pixel line is ended. Between the start point (turn-off) and the end point (turn-on), the pixel driving voltage EVDD is constantly maintained.

As described above, if the pixel driving voltage EVDD is changed in the PWM interval of the second pixel line, one or more first pixel lines for sensing a threshold voltage in the PWM interval of the second pixel line among the first pixel lines included in the first display area can operate abnormally.

The detailed explanation thereof is as follows.

FIGS. 11 to 14 are diagrams explaining why mura occurs on a display area of a display device.

Figure 11:
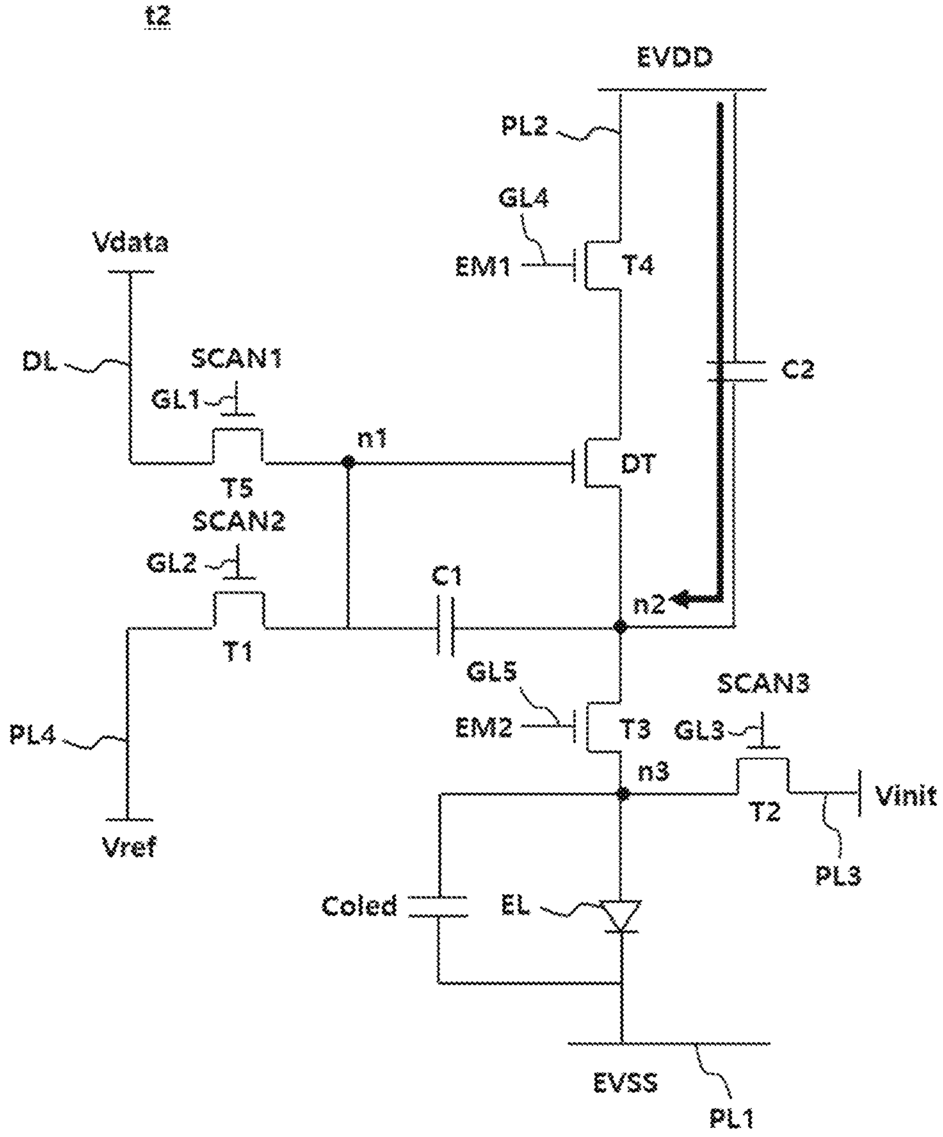
FIGS. 11 to 14 are diagrams explaining why mura occurs on a display area of a display device.

Referring to FIG. 11, if the pixel driving voltage EVDD is changed by the PWM interval of the second pixel line in the threshold voltage sensing period t2 of the pixel circuits included in the first pixel line, the changed pixel driving voltage EVDD can be applied to the second node n2 through the second capacitor C2.

Due to this, the threshold voltage sensing results of the pixel circuits included in the first pixel line can be affected.

Specifically, at the start point (turn-off) of the PWM interval in which the pixel driving voltage EVDD increases in the PWM interval of the second pixel line, an increment (ΔEVDD_1) of the pixel driving voltage EVDD can exert an influence on the threshold voltage sensing results of the pixel circuits.

Figure 12:
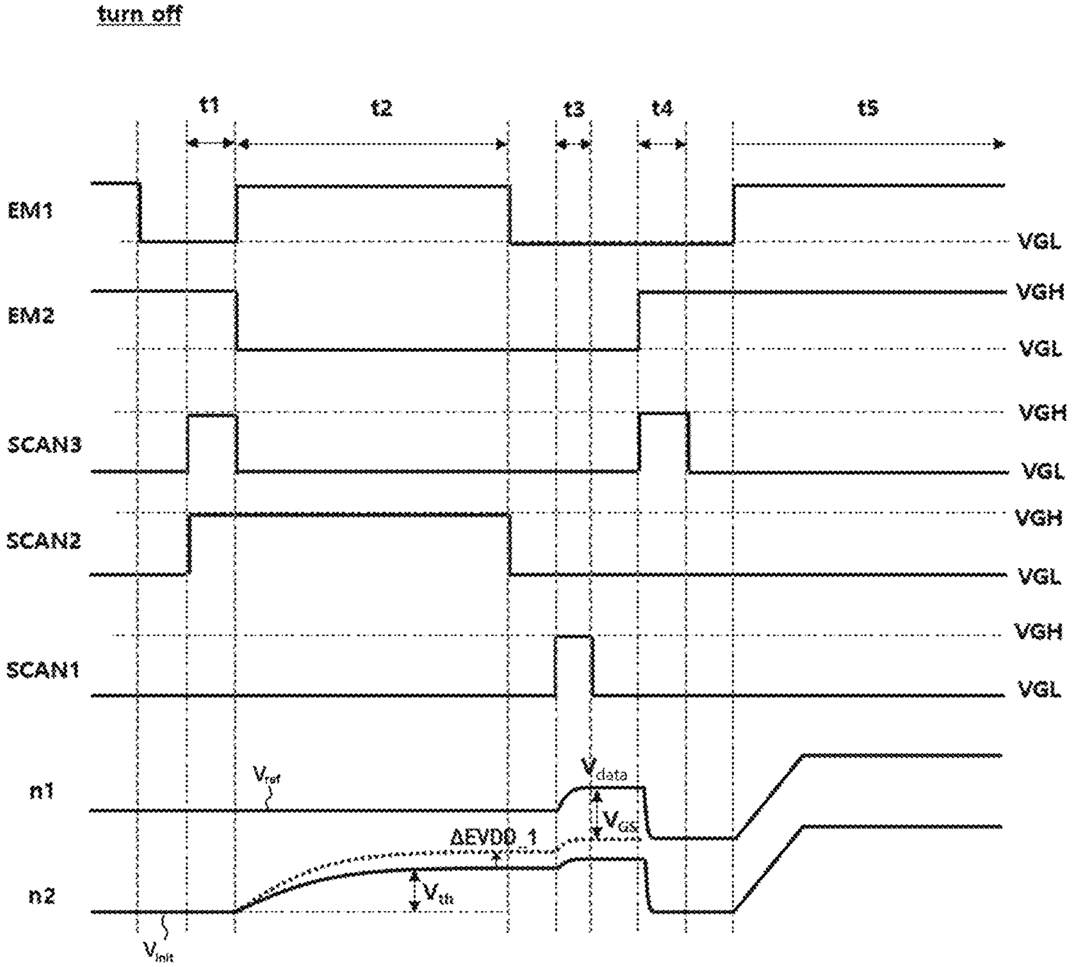

Referring to FIG. 12, after the threshold voltage sensing period t2 of the pixel circuits included in the first pixel line is ended (e.g., between t2 and t3), the voltage of the first node n1 becomes the reference voltage Vref. The voltage of the second node n2 becomes a voltage (Vref−Vth+ΔEVDD_1) obtained by subtracting the threshold voltage Vth of the driving element DT from the reference voltage Vref and adding the increment (ΔEVDD_1) of the pixel driving voltage EVDD thereto. Further, the gate-source voltage VGS of the driving element DT becomes a voltage (Vref−Vref+Vth−ΔEVDD_1=Vth−ΔEVDD_1) obtained by subtracting the voltage (Vref−Vth+ΔEVDD_1) of the second node n2 from the voltage Vref of the first node n1.

In other words, after the threshold voltage sensing period t2 of the pixel circuits included in the first pixel line is ended, the gate-source voltage VGS of the driving element DT decreases to a value (Vth−ΔEVDD_1) obtained by subtracting the increment (ΔEVDD_1) of the pixel driving voltage EVDD from the threshold voltage Vth of the driving element DT. Due to this, even in the data writing period t3, the gate-source voltage VGS of the driving element DT decreases. If the gate-source voltage VGS of the driving element DT decreases in the data writing period, the luminance can decrease, and thus dark mura can occur.

Figure 13:
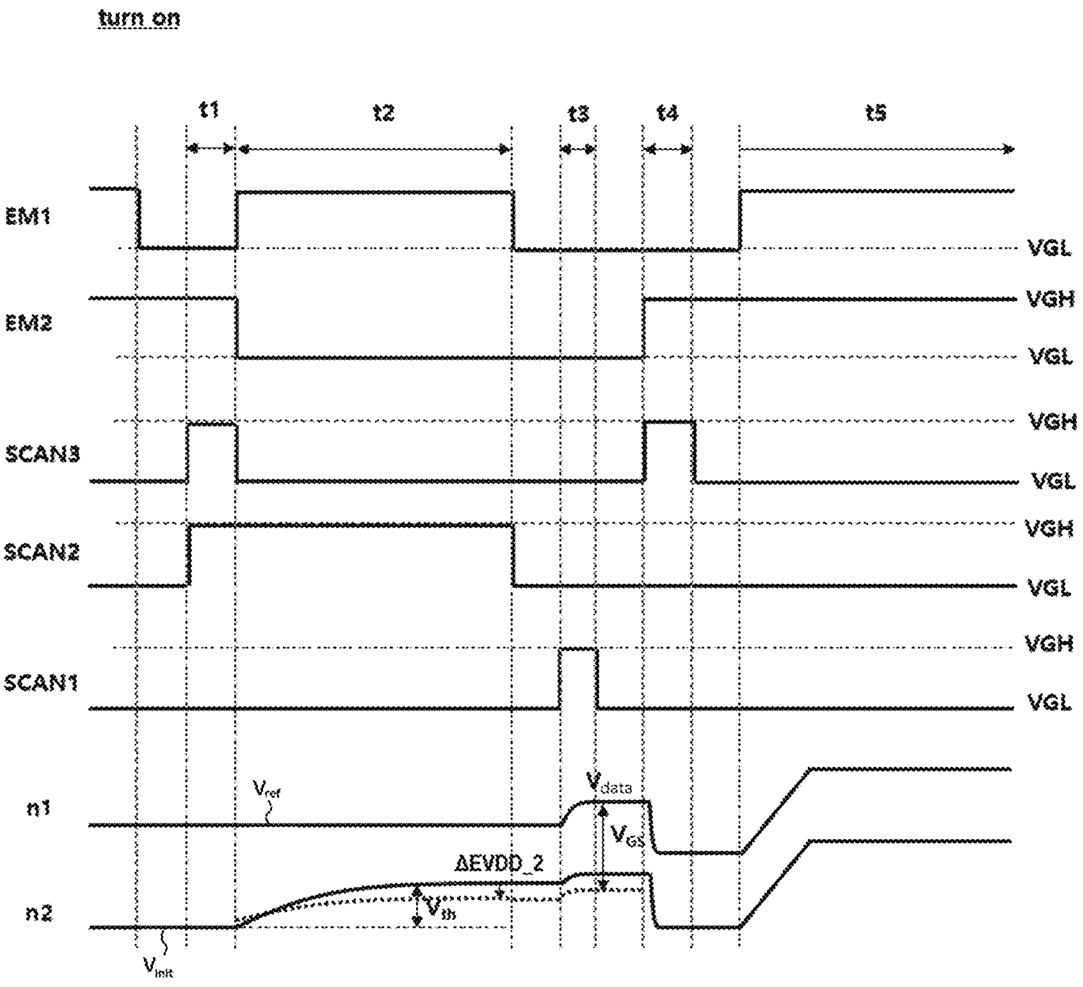

Referring to FIG. 13, at the end point (turn-on) of the PWM interval in which the pixel driving voltage EVDD of the second pixel line decreases, a decrement (ΔEVDD_2) of the pixel driving voltage EVDD can exert an influence on the threshold voltage sensing results of the pixel circuits. The decrement (ΔEVDD_2) of the pixel driving voltage EVDD can have a negative value (−).

After the threshold voltage sensing period t2 of the pixel circuits included in the first pixel line is ended, the voltage of the first node n1 becomes the reference voltage Vref. Further, the voltage of the second node n2 becomes a voltage {(Vref−Vth+(−ΔEVDD_2)) obtained by subtracting the threshold voltage Vth of the driving element DT from the reference voltage Vref and adding the decrement (−ΔEVDD_2) of the pixel driving voltage EVDD thereto. The gate-source voltage VGS of the driving element DT becomes a voltage (Vref-Vref+Vth+ΔEVDD_2=Vth+ΔEVDD_2) obtained by subtracting the voltage (Vref−Vth−ΔEVDD_2) of the second node n2 from the voltage Vref of the first node n1.

In other words, the gate-source voltage VGS of the driving element DT increases to a value (Vth+ΔEVDD_2) obtained by adding the decrement (ΔEVDD_2) of the pixel driving voltage EVDD to the threshold voltage Vth. Due to this, even in the data writing period t3, the gate-source voltage VGS of the driving element DT increases. If the gate-source voltage VGS of the driving element DT increases in the data writing period t3, the luminance increases, and thus bright mura can occur.

Figure 14:
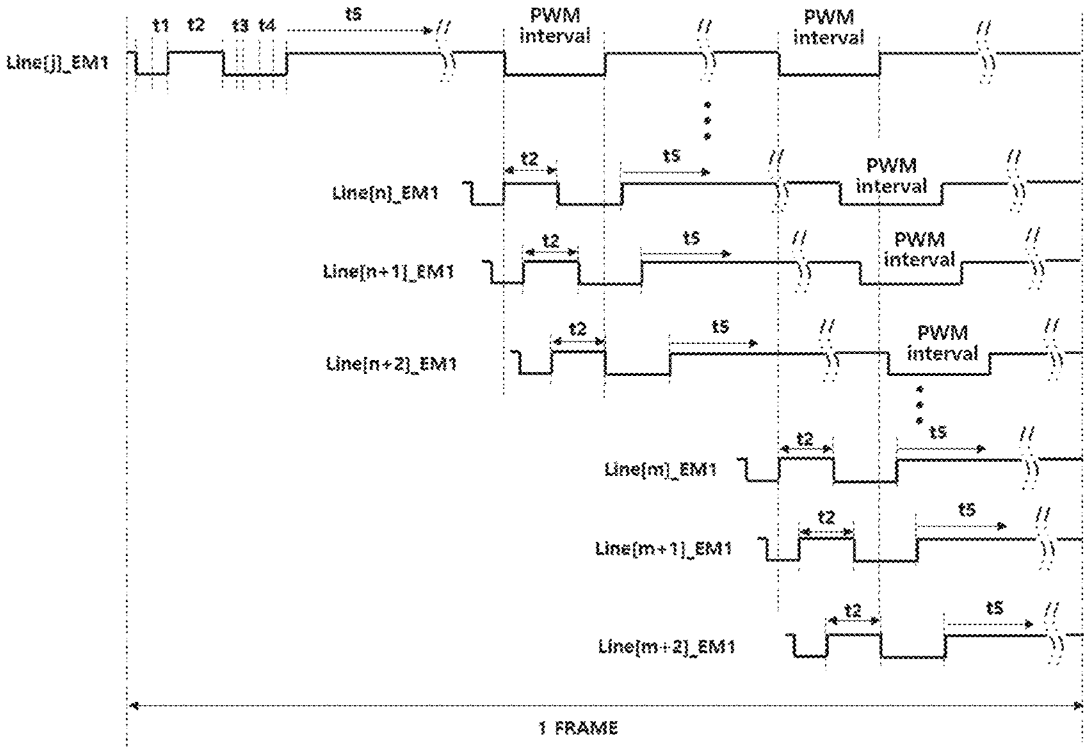

Meanwhile, in the PWM interval of one second pixel line (Line[j]) as in FIG. 14, the threshold voltage sensing period t2 of one or more first pixel lines (Line[n] to Line[n+2], and Line[m] to Line[m+2]) can arrive.

Figure 15:
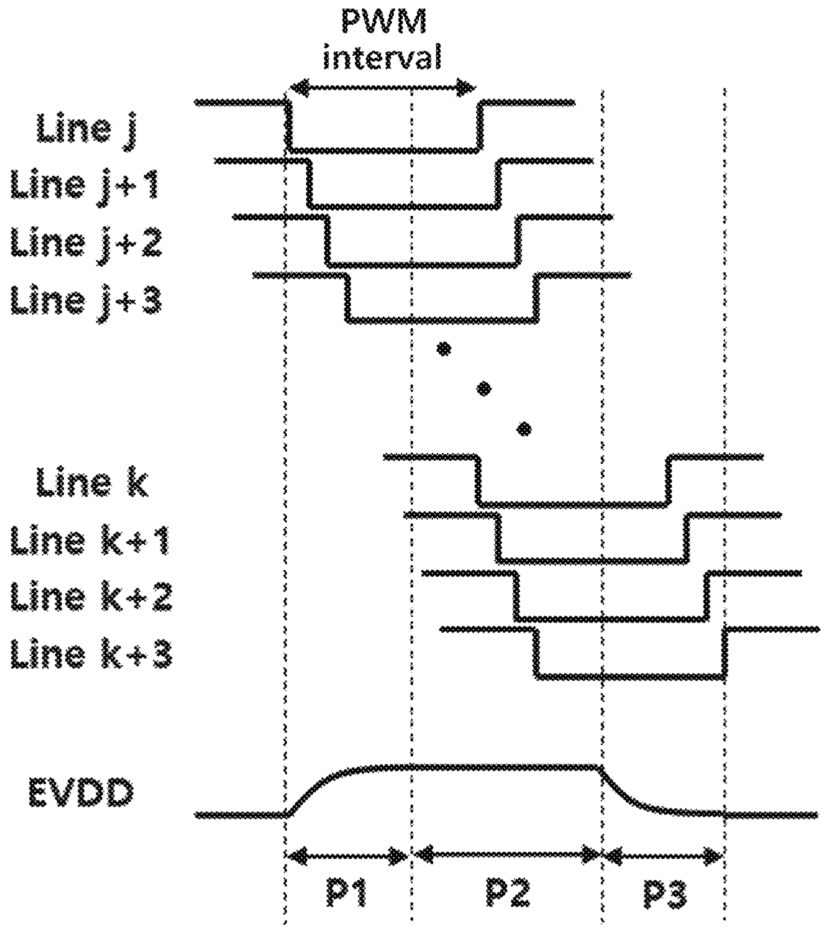
FIGS. 15 and 16 are diagrams explaining mura that occurs when a PWM interval length of pixel lines on which high-grayscale line data is written is a first length.

Further, since the PWM intervals of the second pixel lines (Line[j] to Line[n+3], and Line[k] to Line[k+3]) arrive sequentially as in FIG. 15, the number of second pixel lines, on which the start point (turn-off) of the PWM interval arrives in the first period P1 among the second pixel lines (Line[j] to Line[n+3], and Line[k] to Line[k+3]), can gradually increase. Accordingly, the pixel driving voltage EVDD can gradually increase in the first period P1. Here, j, k, n and m can be real numbers.

In the second period P2, the number of second pixel lines (e.g., Line[j], Line[j+1], Line[j+2], and Line[j+3]) on which the end point (turn-on) of the PWM interval arrives can be equal or similar to the number of second pixel lines (e.g., Line[j], Line[j+1], Line[j+2], and Line[j+3]) on which the start point (turn-off) of the PWM interval arrives. In this case, the pixel driving voltage EVDD can be constantly maintained.

In the third period P3, the number of second pixel lines on which the end point (turn-on) of the PWM interval arrives can gradually increase. Accordingly, the pixel driving voltage EVDD can gradually decrease in the third period P3.

If all the PWM intervals of the second pixel lines (Line[j] to Line[n+3], and Line[k] to Line[k+3]) are ended, the pixel driving voltage EVDD can be constantly maintained.

As described above, since the pixel driving voltage EVDD can be changed even by the PWM driving of all the second pixel lines (Line[j] to Line[n+3], and Line[k] to Line[k+3]), mura can occur on the first display area on which the low-grayscale line data are displayed.

Figure 16:
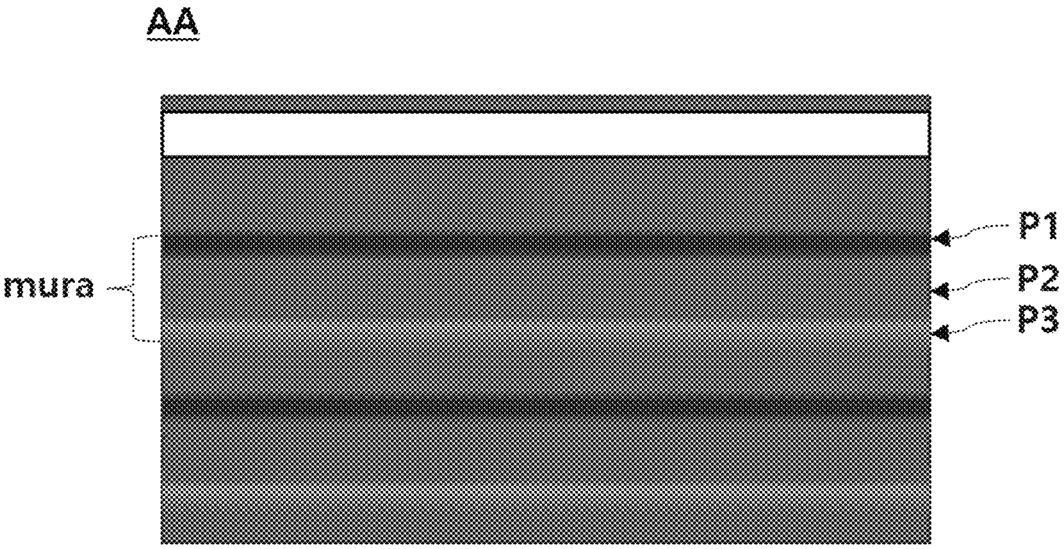

Here, as in FIG. 16, the mura occurrence area on which the mura occurs on the first display area can include a dark stripe area which occurs in the first period P1 and on which the mura is displayed with a luminance that is smaller than a luminance value of the low-grayscale line data, a normal area which occurs in the second period P2 and on which the mura is displayed with the same luminance as the luminance value of the low-grayscale line data, and a bright stripe area which occurs in the third period P3 and on which the mura is displayed with a luminance that is larger than the luminance value of the low-grayscale line data.

Figure 17:
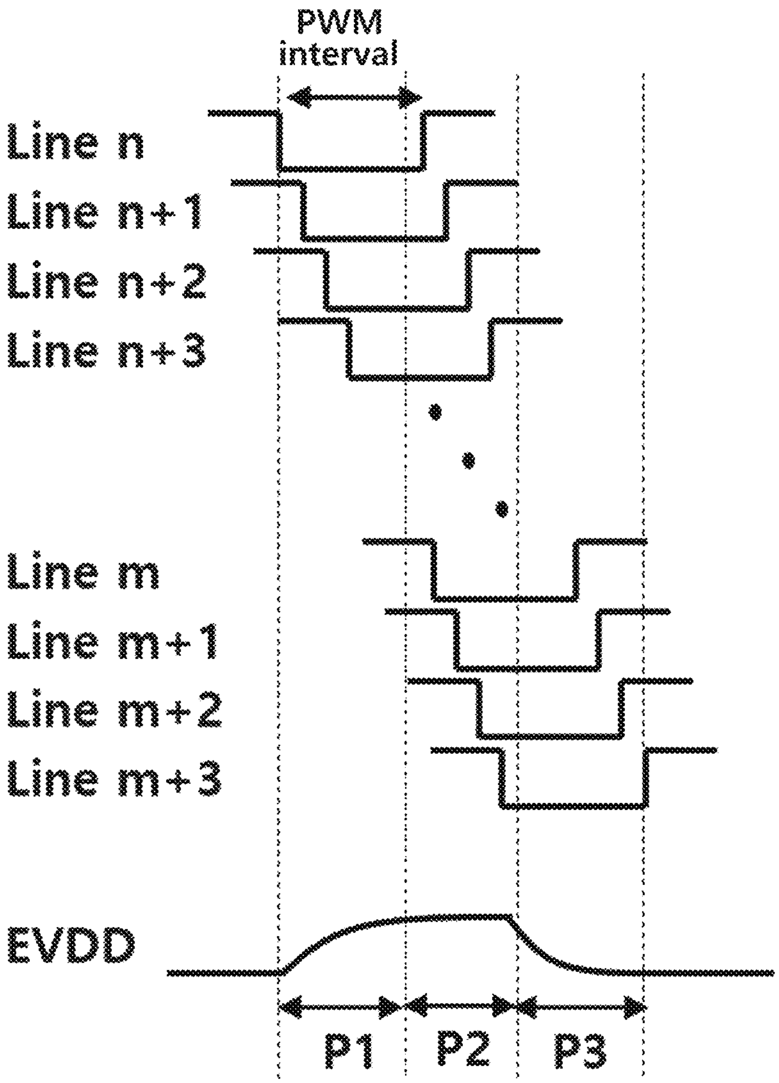
FIGS. 17 and 18 are diagrams explaining mura that occurs when a PWM interval length of pixel lines on which high-grayscale line data is written is a second length.
Figure 18:
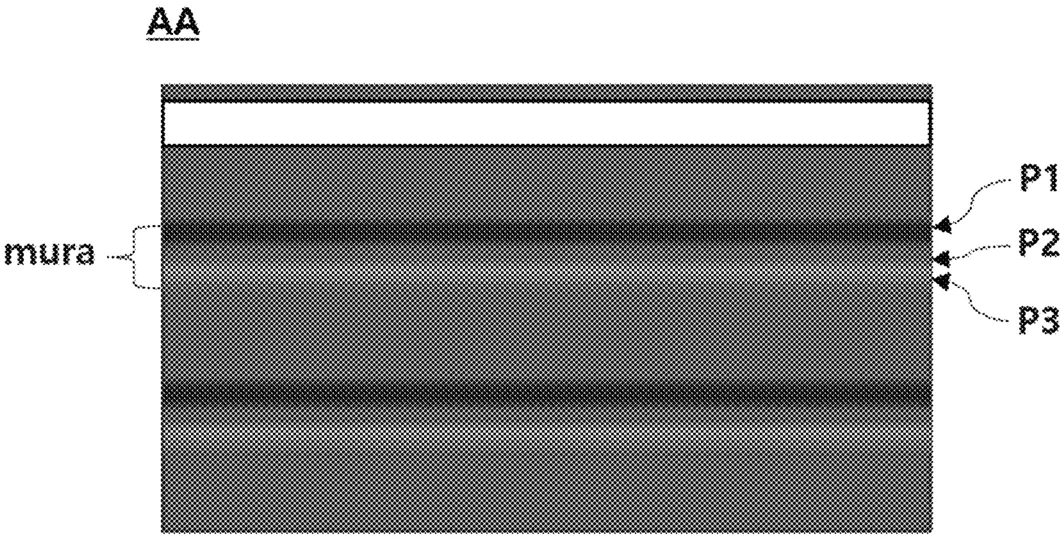

Meanwhile, as in FIG. 17, if the PWM interval of the second pixel lines (Line[j] to Line[n+3], and Line[k] to Line[k+3]) is shorter than the PWM interval of FIG. 15, the second period P2 can be significantly shortened. Due to this, the width of the normal area that occurs in the second period P2 can be narrowed as in FIG. 18.

Hereinafter, a configuration in which a display device, for example, a display panel driver, compensates for mura in the first embodiment of the present disclosure will be described.

Figure 19:
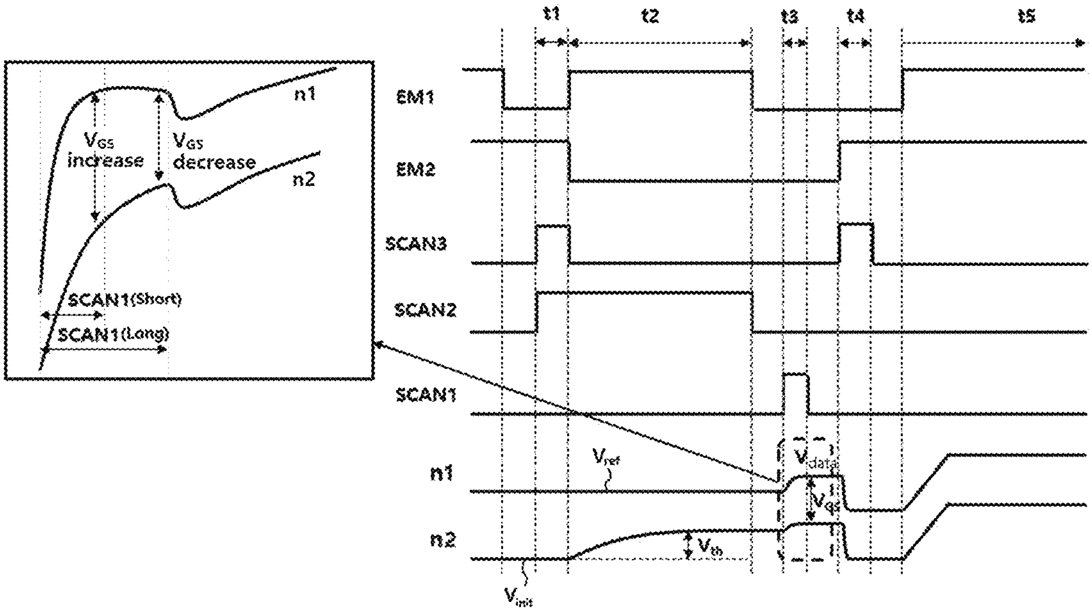
FIG. 19 is a diagram explaining a gate-source voltage of a driving element which is changed when a first gate signal that is synchronized with a data voltage is adjusted in the first embodiment of the present disclosure.

FIG. 19 is a diagram explaining a gate-source voltage of a driving element which is changed when a first gate signal that is synchronized with a data voltage is adjusted in the first embodiment of the present disclosure.

In the first embodiment of the present disclosure, a reason why mura occurs is because the pixel driving voltage EVDD increases or decreases in the PWM interval of the second pixel lines, and thus the gate-source voltage VGS of the driving element DT included in the pixel circuits of the first pixel line decreases or increases in the data writing period t3.

Here, the data voltage Vdata is applied to the pixel circuit of the first pixel line in the data writing period t3. During a period in which the data voltage Vdata is applied, for example, during the data writing period t3, the voltage divider effect of the first capacitor C1 and the second capacitor C2 occurs. By the voltage divider effect of the first capacitor C1 and the second capacitor C2, the voltage of the second node n2 rises more slowly than the voltage of the first node n1.

Referring to FIG. 19, when the data voltage Vdata is applied at the beginning, it can be identified that the gate-source voltage VGS of the driving element DT, which is a difference in voltage between the first node n1 and the second node n2, becomes larger, and towards the end of the data writing period t3, the gate-source voltage VGS becomes smaller.

Accordingly, the gate-source voltage VGS of the driving element DT can be controlled through pulse width adjustment of the first gate signal that is a gate signal that is synchronized with the data voltage Vdata.

In doing so, the display panel driver can compensate for the mura by adjusting the pulse width of the first gate signal that is the gate signal that is synchronized with the data voltage Vdata that is written on the pixel circuits of the first pixel line, for example, the first pixel line.

In other words, the mura can be compensated for by adjusting the pulse width of the first gate signal that determines the data writing period t3 of the first pixel line.

Here, if the pulse with of the first gate signal SCAN1 becomes shorter than the reference pulse width, the gate-source voltage VGS of the driving element DT can increase at the point when the data writing period t3 is ended as in FIG. 19.

If the gate-source voltage VGS of the driving element DT increases, the luminance can increase.

Accordingly, the display panel driver can shorten and output the pulse width of the first gate signal SCAN1 to the first pixel line included in the dark stripe area.

In other words, the gate driving circuit 120 of the display panel driver can shorten and output the pulse width of the first gate signal SCAN1 to the first pixel line included in the dark stripe area.

Meanwhile, if the pulse width of the first gate signal SCAN1 becomes longer than the reference pulse width, the gate-source voltage VGS can decrease at the point when the data writing period t3 is ended as in FIG. 19. Here, the point when the data writing period t3 is ended can be a point when a falling edge of the first gate signal SCAN1 occurs.

If the gate-source voltage VGS of the driving element DT decreases, the luminance can decrease.

Accordingly, the display panel driver can extend and output the pulse width of the first gate signal SCAN1 to the first pixel line included in the bright stripe area.

In other words, the gate driving circuit 120 of the display panel driver can extend and output the pulse width of the first gate signal SCAN1 to the first pixel line included in the bright stripe area.

Figure 20:
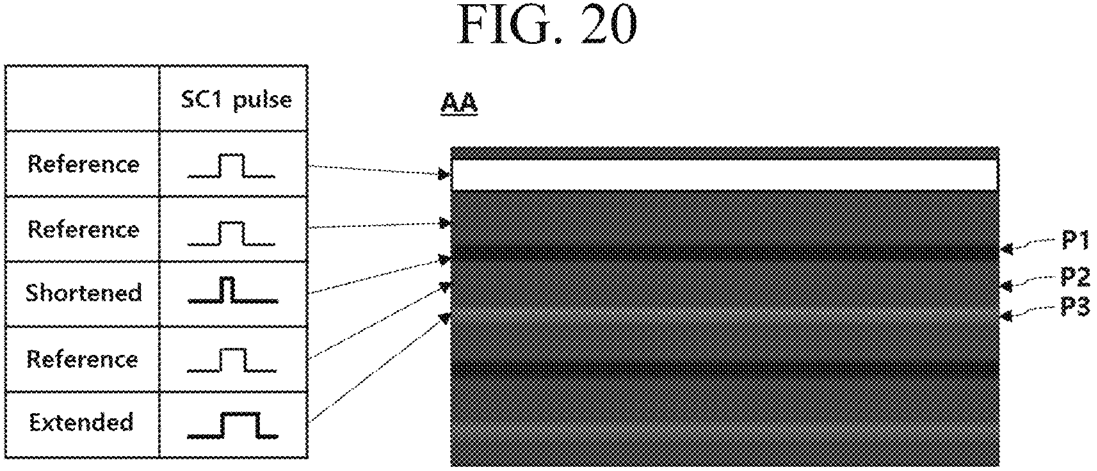
FIG. 20 is a diagram explaining a configuration in which a display device according to the first embodiment of the present disclosure adjusts a first gate signal according to types of mura that occurs on a display area.

For example, in case that the second display area on which the high-grayscale pattern corresponding to the high-grayscale line data is displayed and the first display area on which the low-grayscale pattern is displayed are included in the display area AA as in FIG. 20, the gate driving circuit 120 can output the pulse width of the first gate signal SCAN1 to the second pixel lines included in the second display area without adjusting the pulse width of the first gate signal SCAN1. In other words, the gate driving circuit 120 can configure the pulse width of the first gate signal SCAN1 to the reference pulse width that is a default value, and can output the configured pulse width of the first gate signal SCAN1 to the second pixel lines included in the second display area.

Further, even with respect to the first pixel line included in the area where the mura does not occur in the first display area, the gate driving circuit 120 can output the pulse width of the first gate signal SCAN1 without adjustment.

Meanwhile, in order to compensate for the dark stripe area that occurs in the first period P1 of FIG. 15 or 17 among the mura occurrence areas included in the first display area, the gate driving circuit 120 can make the pulse width of the first gate signal SCAN1 shorter than the reference pulse width, and can output the shortened pulse width of the first gate signal SCAN1 to the first pixel line included in the dark stripe area. If the pulse width of the first gate signal SCAN1 becomes shorter than the reference pulse width, the gate-source voltage VGS of the driving element DT increases in the data writing period t3, and thus the dark stripe area can be compensated for. The dark stripe area is the mura that occurs due to the decrease of the gate-source voltage VGS of the driving element DT in the data writing period t3.

Since the normal area that is an area on which the mura is displayed with the same luminance as the luminance value of the low-grayscale line data in the second period P2 of FIG. 15 or 17, the gate driving circuit 120 can configure the pulse width of the first gate signal SCAN1 to the reference pulse width, and can output the configured pulse width of the first gate signal SCAN1 to the first pixel line included in the normal area.

Since the bright stripe area occurs in the third period P3 of FIG. 15 or 17, the gate driving circuit 120 can extend the pulse width of the first gate signal SCAN1 beyond the reference pulse width, and can output the extended pulse width of the first gate signal SCAN1 to the first pixel line included in the bright stripe area. If the pulse width of the first gate signal SCAN1 is extended beyond the reference pulse width, the gate-source voltage VGS of the driving element DT decreases in the data writing period t3, and thus the bright stripe area can be compensated for. Here, the bright stripe area is the mura that occurs due to the increase of the gate-source voltage VGS of the driving element DT in the data writing period t3.

Figure 21:
FIG. 21 is a diagram exemplarily illustrating a screen on which a high-grayscale pattern and a mura-compensated low-grayscale pattern are displayed together on a display area of a display device according to the first embodiment of the present disclosure.

As described above, the display panel driver including the gate driving circuit 120 can output the first gate signal to the first pixel line included in the mura occurrence area, and can adjust and output the pulse width of the first gate signal SCAN1 to the first pixel line. This can compensate for the mura that occurs on the first display area of the display area AA, as in FIG. 21.

Figure 22:
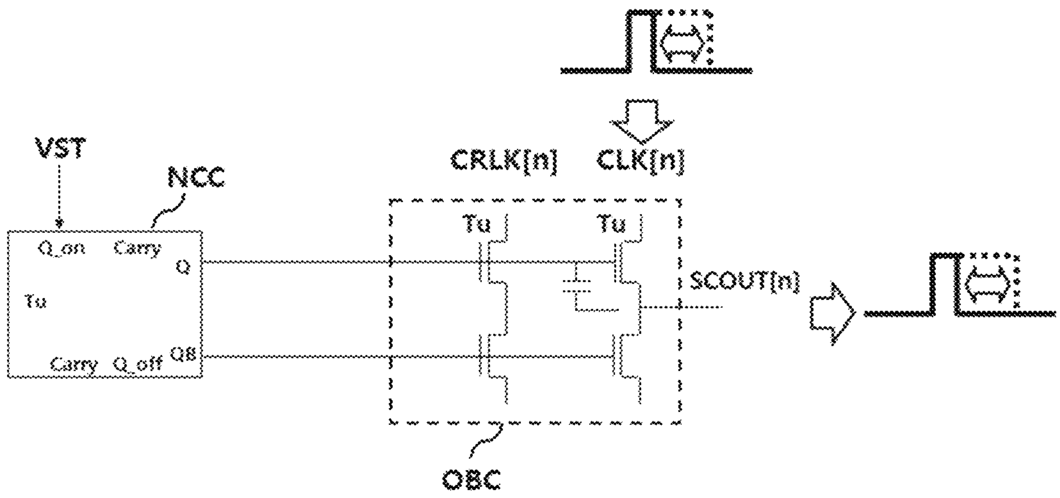
FIG. 22 is a diagram explaining a configuration in which a gate driving circuit of a display device according to the first embodiment of the present disclosure adjusts a first gate signal.

Meanwhile, in the first embodiment of the present disclosure, the gate driving circuit 120 can include a stage circuit including a node control circuit NCC and an output buffer circuit OBC as in FIG. 22.

Further, the pulse width of the first gate signal SCAN1 can be adjusted by a clock signal CLK[n] received from the timing controller 130.

In other words, if the gate driving circuit 120 receives the clock signal CLK[n] of which the pulse width is shortened from the timing controller 130, the gate driving circuit 120 can shorten and output the pulse width of the first gate signal SCAN1.

If the gate driving circuit 120 receives the clock signal CLK[n] of which the pulse width is extended from the timing controller 130, the gate driving circuit 120 can extend and output the pulse width of the first gate signal SCAN1.

As described above, the gate driving circuit 120 can receive the clock signal CLK[n] from the timing controller 130, and can adjust the pulse width of the first gate signal SCAN1.

Figure 23:
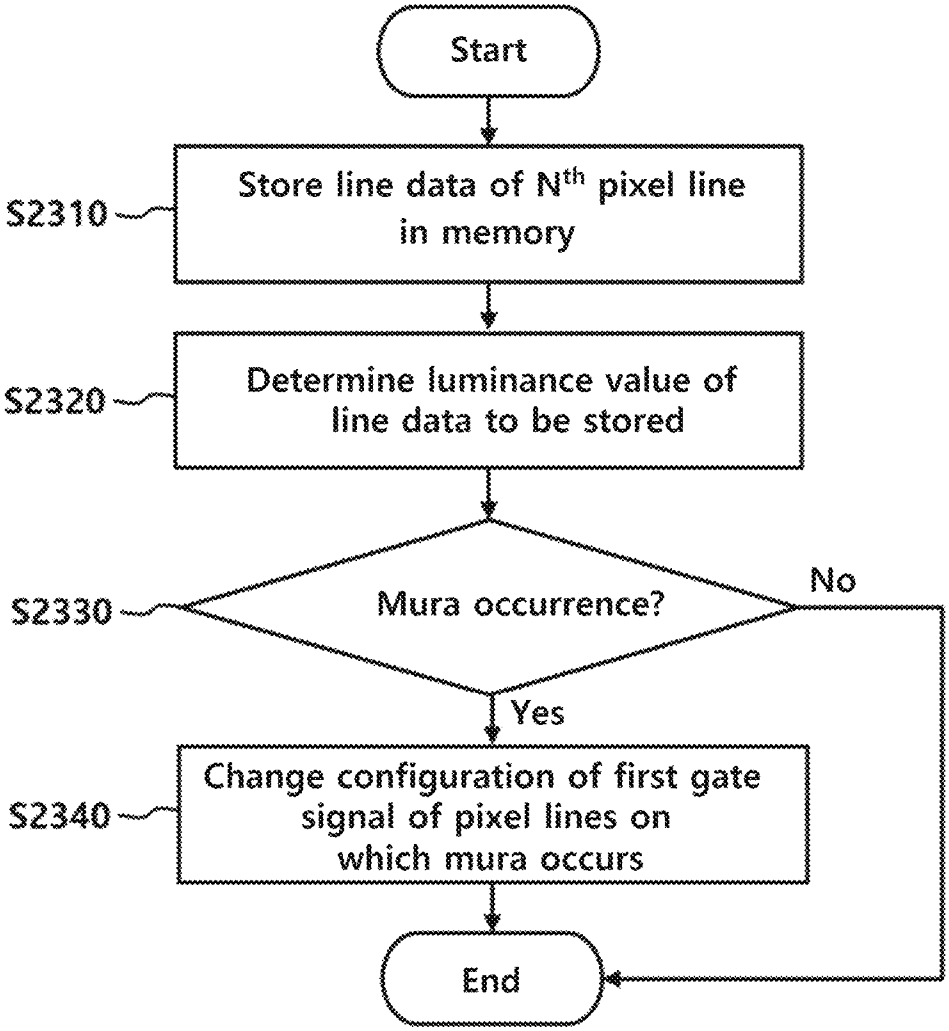
FIG. 23 is a flowchart illustrating a process in which a timing controller of a display device according to the first embodiment of the present disclosure compensates for mura depending on a luminance value of line data.
Figure 24:
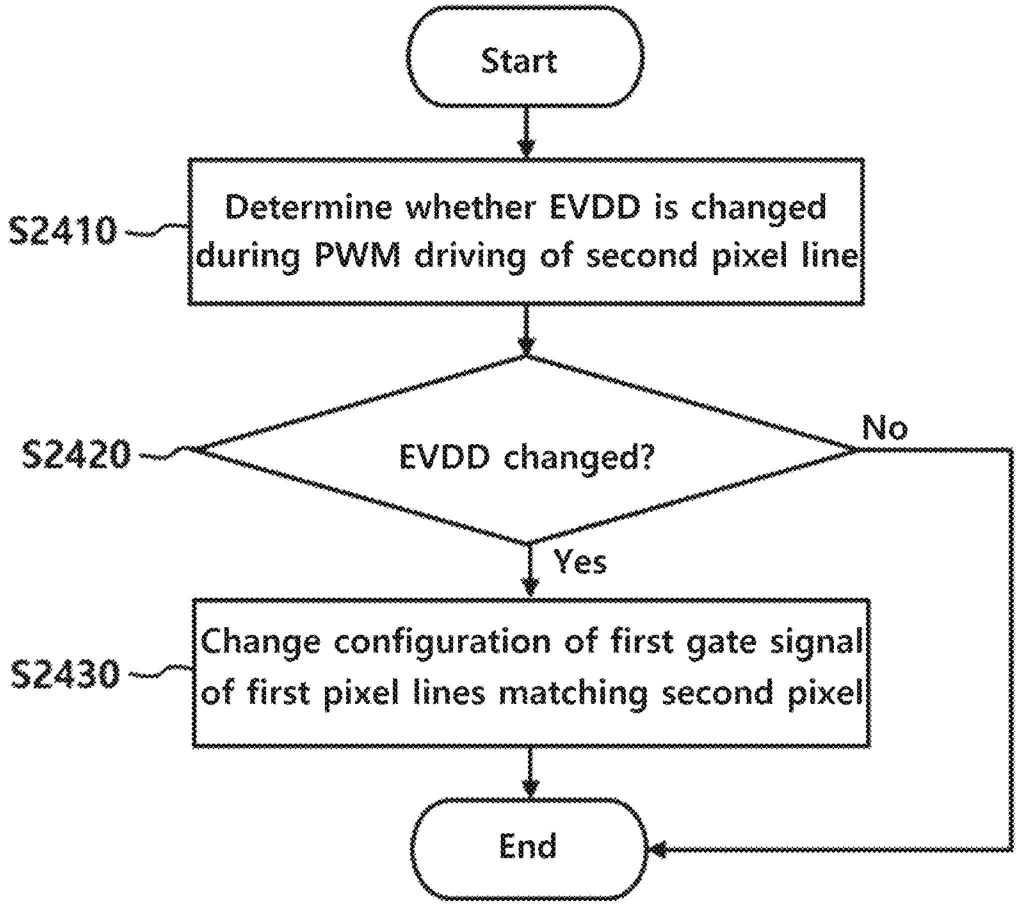
FIG. 24 is a flowchart illustrating a process in which a timing controller of a display device according to the first embodiment of the present disclosure compensates for mura depending on whether a pixel driving voltage is changed.

Further, the timing controller 130 can adjust the pulse width of the clock signal CLK[n] through the process as in FIG. 23 or 24.

In other words, the timing controller 130 can compensate for the mura through the process as in FIG. 23 or 24.

Referring to FIG. 23, the timing controller 130 can store plural pieces of line data included in one piece of frame data in an internal memory.

In other words, the timing controller 130 can sequentially store the line data of the first pixel lines, or can sequentially store the line data of the second pixel lines (S2310).

The timing controller 130 can determine an average luminance value of the line data when storing the line data (S2320).

Through this, if the line data is the low-grayscale line data as the result of determining the average luminance value of the line data, the timing controller 130 does not adjust the pulse width of the clock signal CLK[n] (S2330).

If the line data is the high-grayscale line data in the step S2330, the timing controller 130 changes the configuration of the first gate signal of the first pixel lines on which the mura is to occur by the high-grayscale line data (S2340). In other words, the timing controller 130 adjusts the pulse width of the clock signal CLK[n], and outputs the adjusted pulse width of the clock signal CLK[n] to the gate driving circuit 120. Here, the timing controller 130 can store a lookup table for the location of the pixel line on which the high-grayscale line data is written and the corresponding mura occurrence location (location of the first pixel lines), and can determine the first pixel lines on which the mura is to occur through the lookup table.

In the first embodiment of the present disclosure, the timing controller can compensate for the mura depending on whether the pixel driving voltage EVDD is changed.

Referring to FIG. 24, the timing controller 130 can determine whether the pixel driving voltage EVDD is changed during the PWM driving of the second pixel line (S2410). Here, the timing controller 130 can receive the measurement value of the pixel driving voltage EVDD from the voltage sensing circuit 160 that measures the pixel driving voltage EVDD output from the power supply circuit 140, and can determine whether the pixel driving voltage EVDD is changed.

If the pixel driving voltage EVDD is constant as the result of determining whether the pixel driving voltage EVDD is changed, the timing controller 130 does not adjust the pulse width of the clock signal CLK[n] (S2420).

If it is determined that the pixel driving voltage EVDD is changed in the step S2420, the timing controller 130 changes the configuration of the first gate signal SCAN1 of the first pixel lines matching the second pixel line (S2430). In other words, the timing controller 130 adjusts the pulse width of the clock signal CLK[n], and outputs the adjusted pulse width of the clock signal CLK[n] to the gate driving circuit 120.

As described above, in the first embodiment of the present disclosure, the display device can compensate for the mura by adjusting the gate signal of the pixel lines included in the display area on which the mura in the stripe form occurs.

Figure 25:
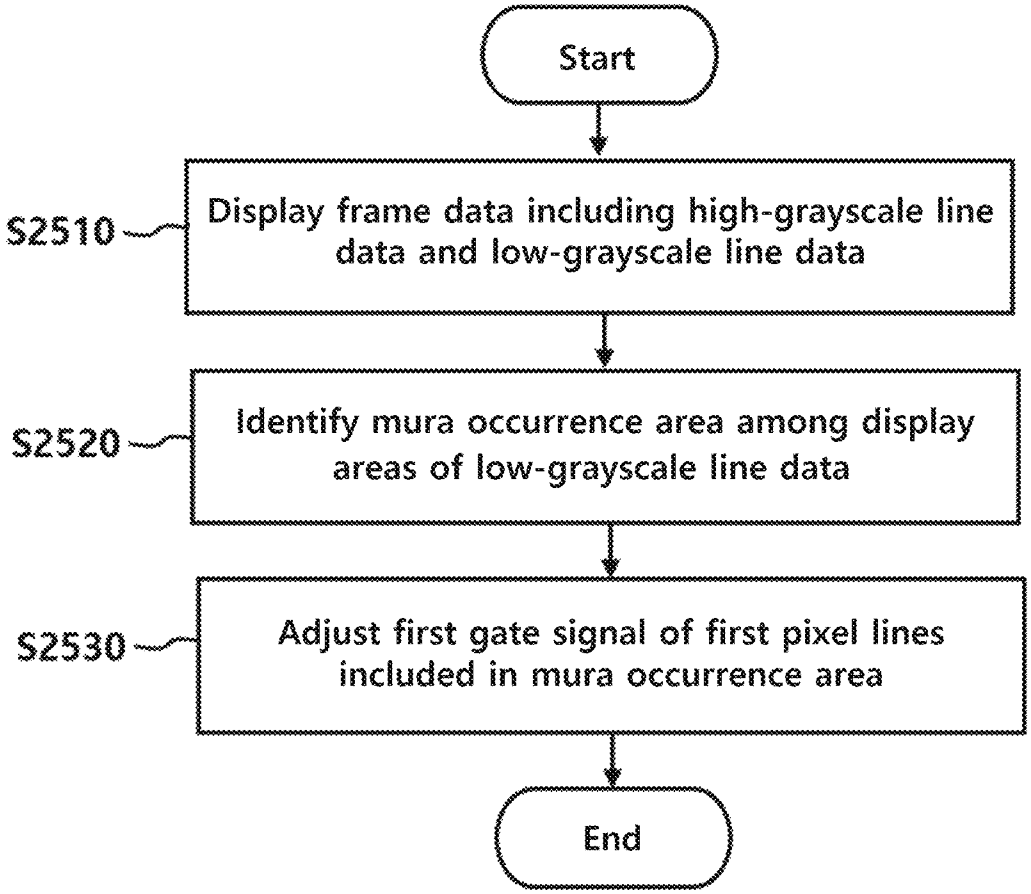
FIG. 25 is a flowchart illustrating a process in which a display device according to the first embodiment of the present disclosure compensates for mura.

In other words, the display device can compensate for the mura through the process as in FIG. 25.

FIG. 25 is a flowchart illustrating a process in which a display device according to the first embodiment of the present disclosure compensates for mura.

Referring to FIG. 25, the display device can display frame data including the high-grayscale line data and the low-grayscale line data on the display panel (S2510).

Further, the display device can identify the mura occurrence area in the first display area of the display panel on which the low-grayscale line data are displayed (S2520).

In order to compensate for the mura on the mura occurrence area, the display device can adjust the pulse width of the first gate signal SCAN1 that is input to the first pixel lines included in the mura occurrence area, and input the adjusted pulse width of the first gate signal SCAN1 to the first pixel lines (S2530).

In the step S2510, the display device can display the high-grayscale line data on the second display area that is different from the first display area.

Here, the display device can perform the pulse width modulation (PWM) driving of the first pixel lines included in the mura occurrence area and the second pixel lines included in the second display area.

In the step S2530, the mura occurrence area can include the dark stripe area on which the mura is displayed with the luminance that is smaller than the luminance value of the low-grayscale line data, the normal area on which the mura is displayed with the same luminance as the luminance value of the low-grayscale line data, and the bright stripe area on which the mura is displayed with the luminance that is larger than the luminance value of the low-grayscale line data.

In the step S2530, the display device can shorten the pulse width of the first gate signal SCAN1 from the reference pulse width, and can input the shortened pulse width of the first gate signal SCAN1 to one or more first pixel lines included in the dark stripe area.

Further, the display device can configure the pulse width of the first gate signal SCAN1 to the reference pulse width, and can input the configured pulse width of the first gate signal SCAN1 to one or more first pixel lines included in the normal area.

Further, the display device can extend the pulse width of the first gate signal SCAN1 beyond the reference pulse width, and can input the extended pulse width of the first gate signal SCAN1 to one or more first pixel lines included in the bright stripe area. Here, the reference pulse width can be a default value basically configured in the display device.

The display device can compensate for the mura on the mura occurrence area through above-described process, and through this, the display device can improve the picture quality.

Figure 26:
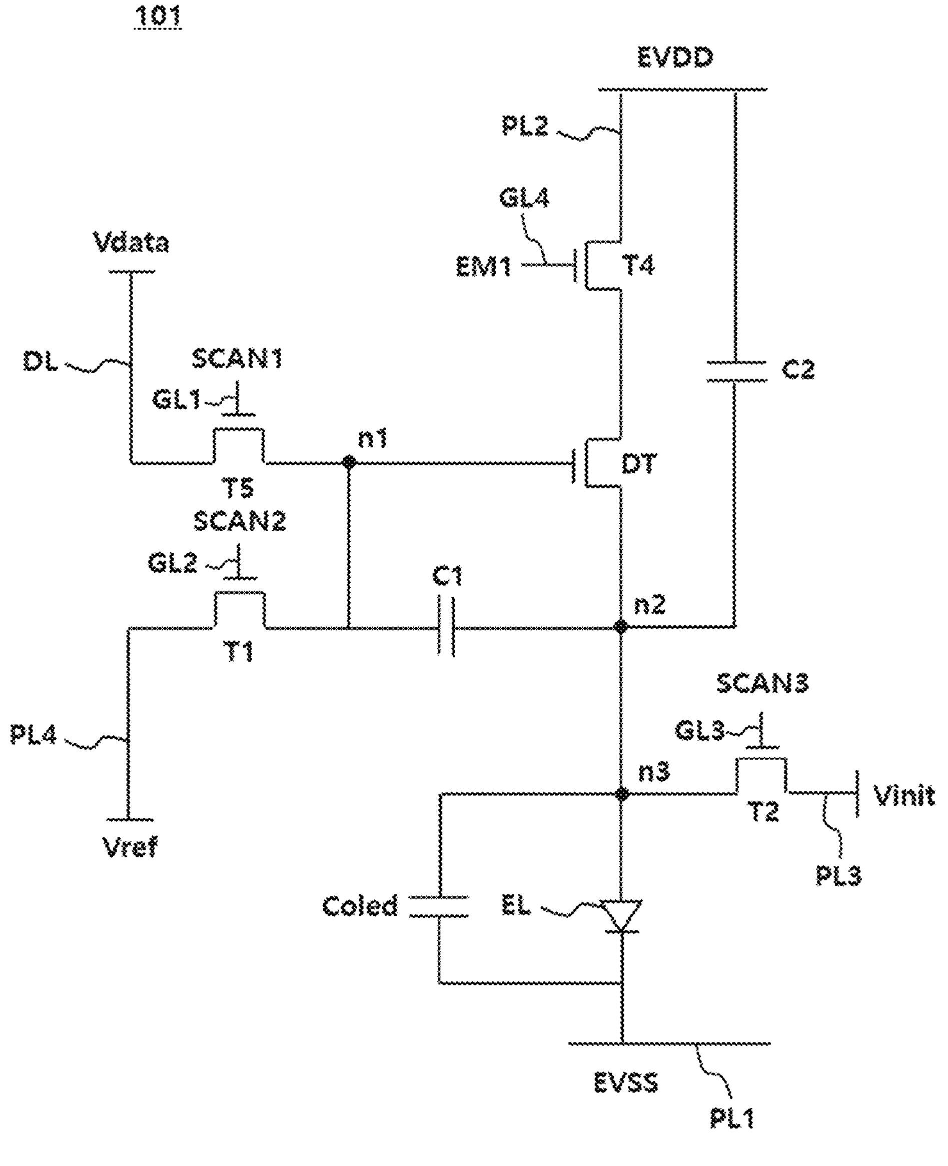
FIG. 26 is a diagram exemplarily illustrating another configuration of a pixel circuit according to the first embodiment of the present disclosure.

Meanwhile, in the first embodiment of the present disclosure, it is illustrated in FIG. 3 that the pixel circuit 101 includes five switch elements T1 to T5, but the first embodiment of the present disclosure is not limited thereto, and the pixel circuit can include four switch elements T1, T2, T4, and T5 excluding the third switch element T3 as in FIG. 26. In other words, in case of the structure in which the second capacitor C2 of the pixel circuit is connected between the second power line PL2 and the second node n2, the number of switch elements can be four or less, or six or more.

Hereinafter, a method for compensating for mura according to the second embodiment of the present disclosure will be described.

Figure 27:
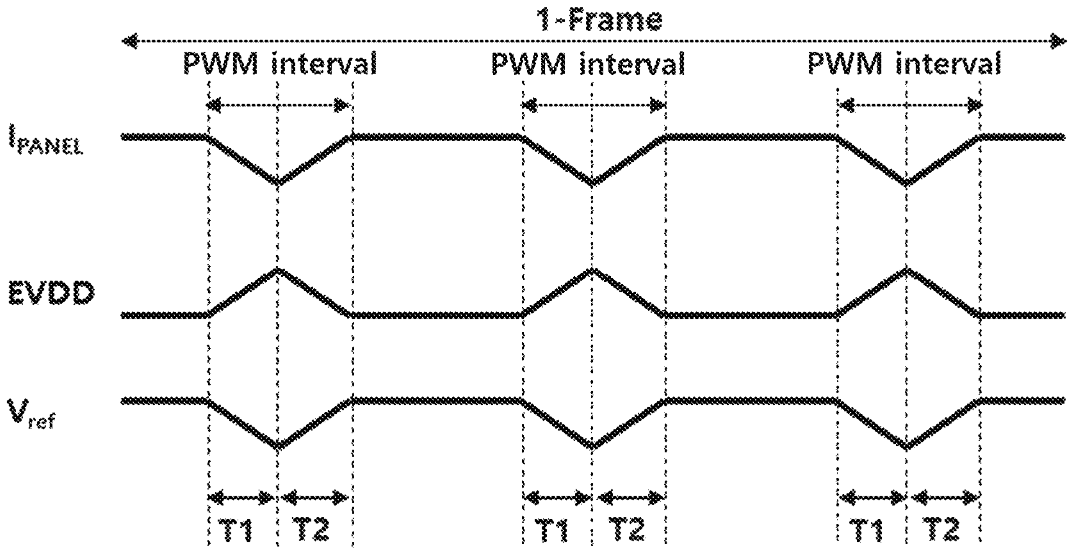
FIGS. 27 to 29 are diagrams explaining a method for compensating for mura according to a second embodiment of the present disclosure.
Figure 28:
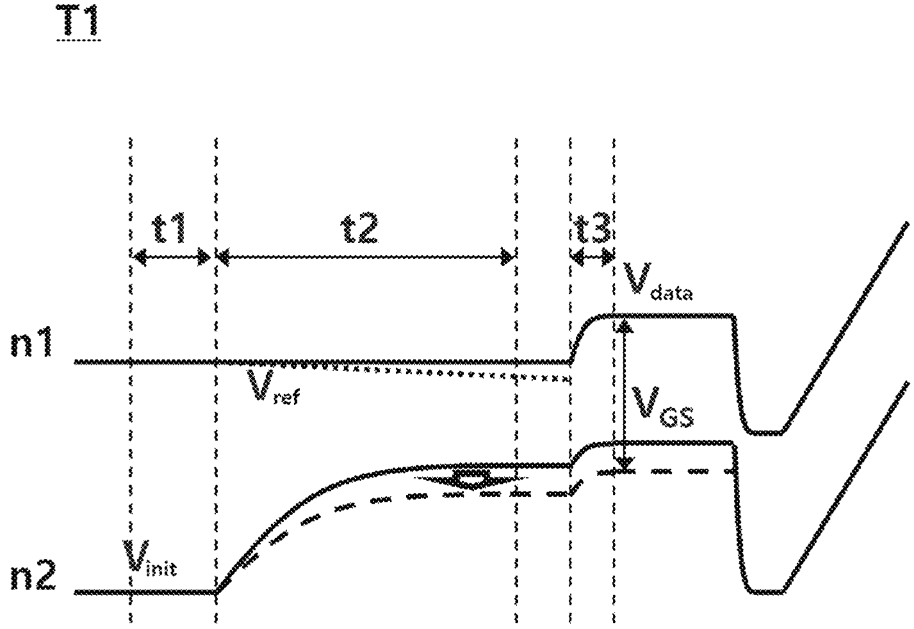
Figure 29:
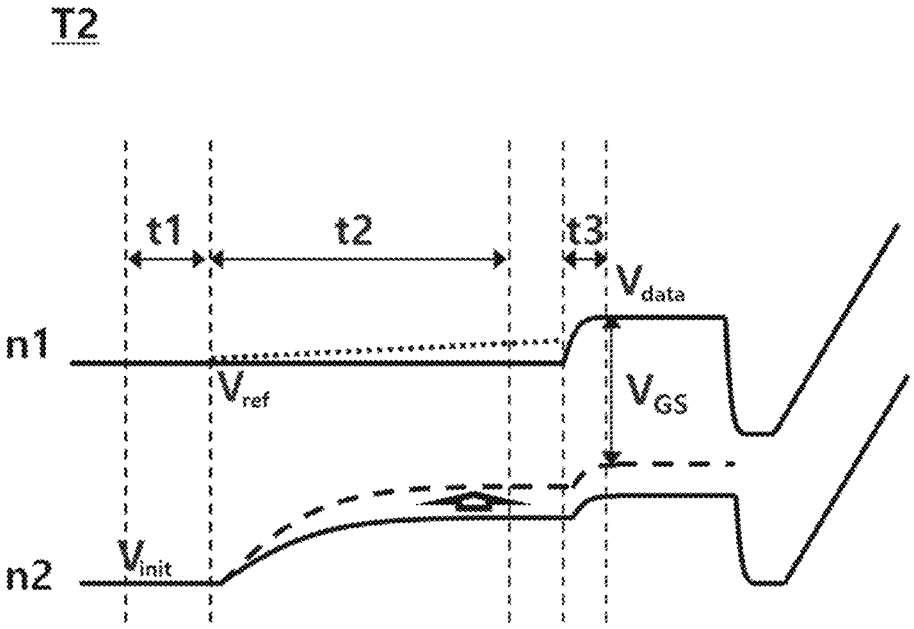

FIGS. 27 to 29 are diagrams explaining a method for compensating for mura according to the second embodiment of the present disclosure.

Referring to FIG. 27, in the second embodiment of the present disclosure, the mura can be compensated for by decreasing the reference voltage Vref in the first period T1 in which the pixel driving voltage EVDD increases in the PWM interval of the second pixel line and by increasing the reference voltage Vref in the second period T2 in which the pixel driving voltage EVDD decreases.

Here, if the reference voltage Vref decreases in the first period T1, the reference voltage Vref that is applied to the first node n1 of the pixel circuit included in the first pixel line gradually decreases from the threshold voltage sensing period t2 like a dotted line part of FIG. 28. Here, the pixel circuit of the first pixel line is a pixel circuit for which the threshold voltage sensing period t2 arrives in the first period T1.

If the reference voltage Vref that is applied to the first node n1 gradually decreases as described above, the voltage (solid line part of FIG. 28) of the second node n2, which increases due to the increase of the pixel driving voltage EVDD, can decrease like a dashed line part of FIG. 28.

Accordingly, even if the pixel driving voltage EVDD increases in the first period T1, the gate-source voltage VGS of the driving element DT does not decrease.

Further, if the reference voltage Vref increases in the second period T2, the reference voltage Vref that is applied to the first node n1 of the pixel circuit included in the first pixel line gradually increases from the threshold voltage sensing period t2 like a dotted line part of FIG. 29.

If the reference voltage Vref that is applied to the first node n1 gradually increases as described above, the voltage (solid line part of FIG. 29) of the second node n2, which decreases due to the decrease of the pixel driving voltage EVDD, can increase like a dashed line part of FIG. 29.

Accordingly, even if the pixel driving voltage EVDD decreases in the second period T2, the gate-source voltage VGS of the driving element DT does not increase.

As a result, since the gate-source voltage VGS of the driving element is constantly maintained without decreasing or increasing in the first period T1 and the second period T2, the mura does not occur in the first display area on which the low-grayscale pattern is displayed.

Up to now, the mura compensation method through adjustment of the pulse width of the first gate signal SCAN1 or adjustment of the reference voltage Vref has been described.

However, the present disclosure is not limited thereto, and the mura can be prevented from occurring by changing the configuration of the pixel circuit.

Figure 30:
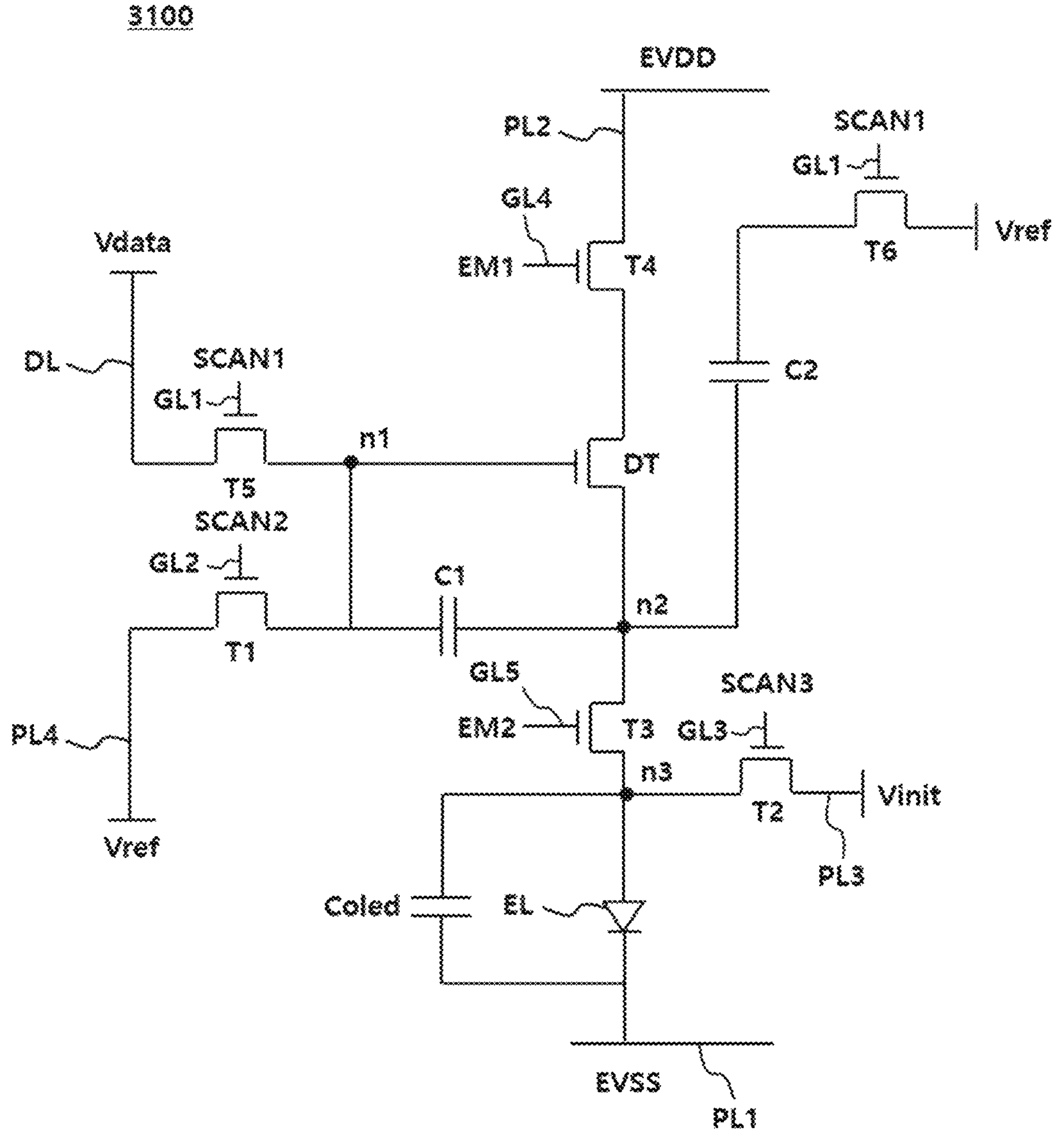
FIG. 30 is a diagram exemplarily illustrating a configuration of a pixel circuit according to a third embodiment of the present disclosure.
Figure 31:
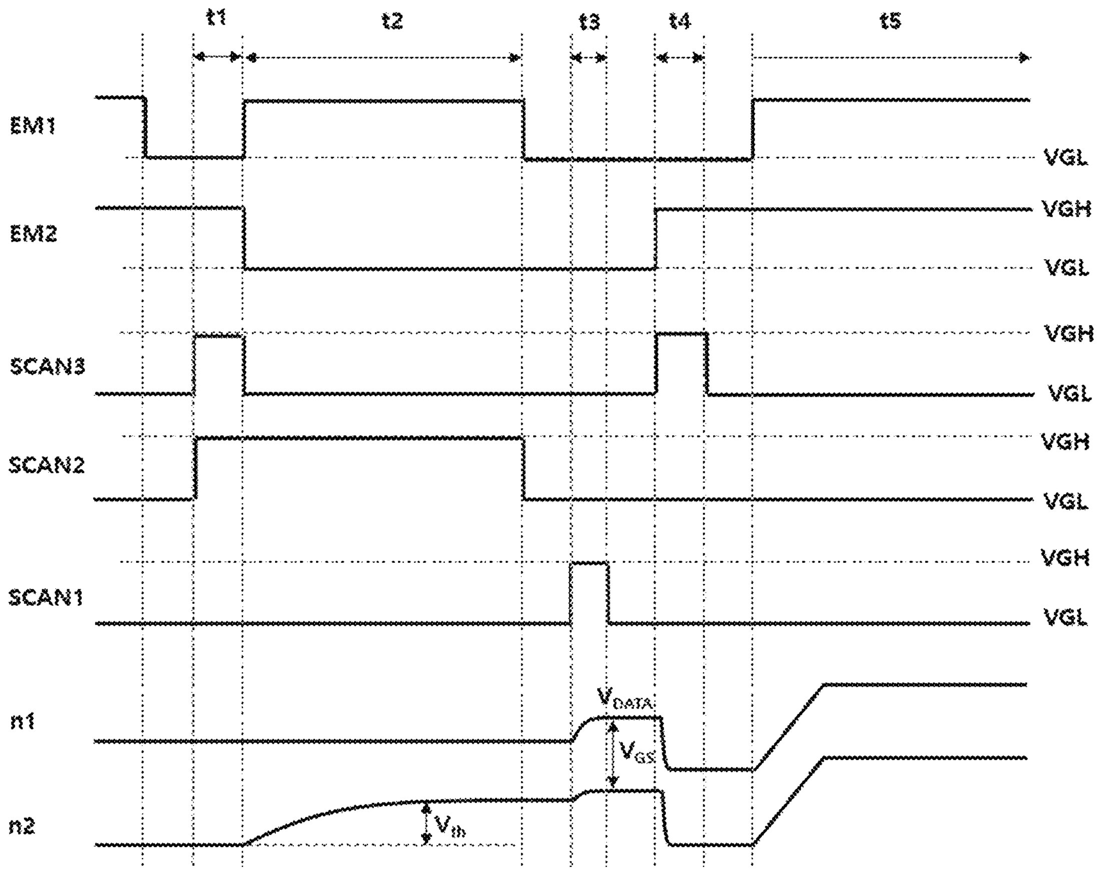
FIG. 31 is a diagram showing waveforms of a gate signal and a node voltage being applied to a pixel circuit illustrated in FIG. 30.
Figure 32:
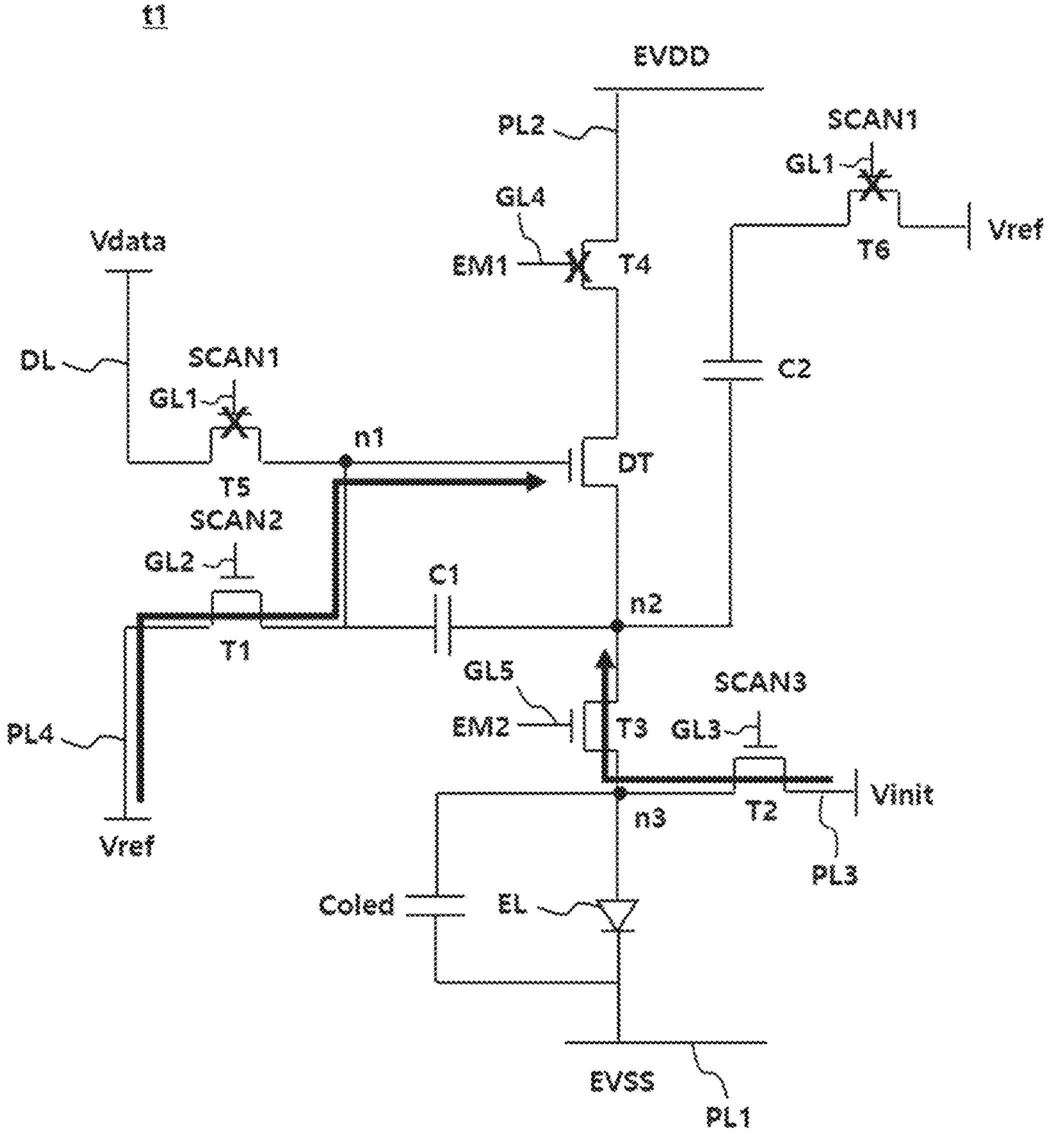
FIG. 32 is a diagram showing an initialization period operation of a pixel circuit illustrated in FIG. 30.
Figure 33:
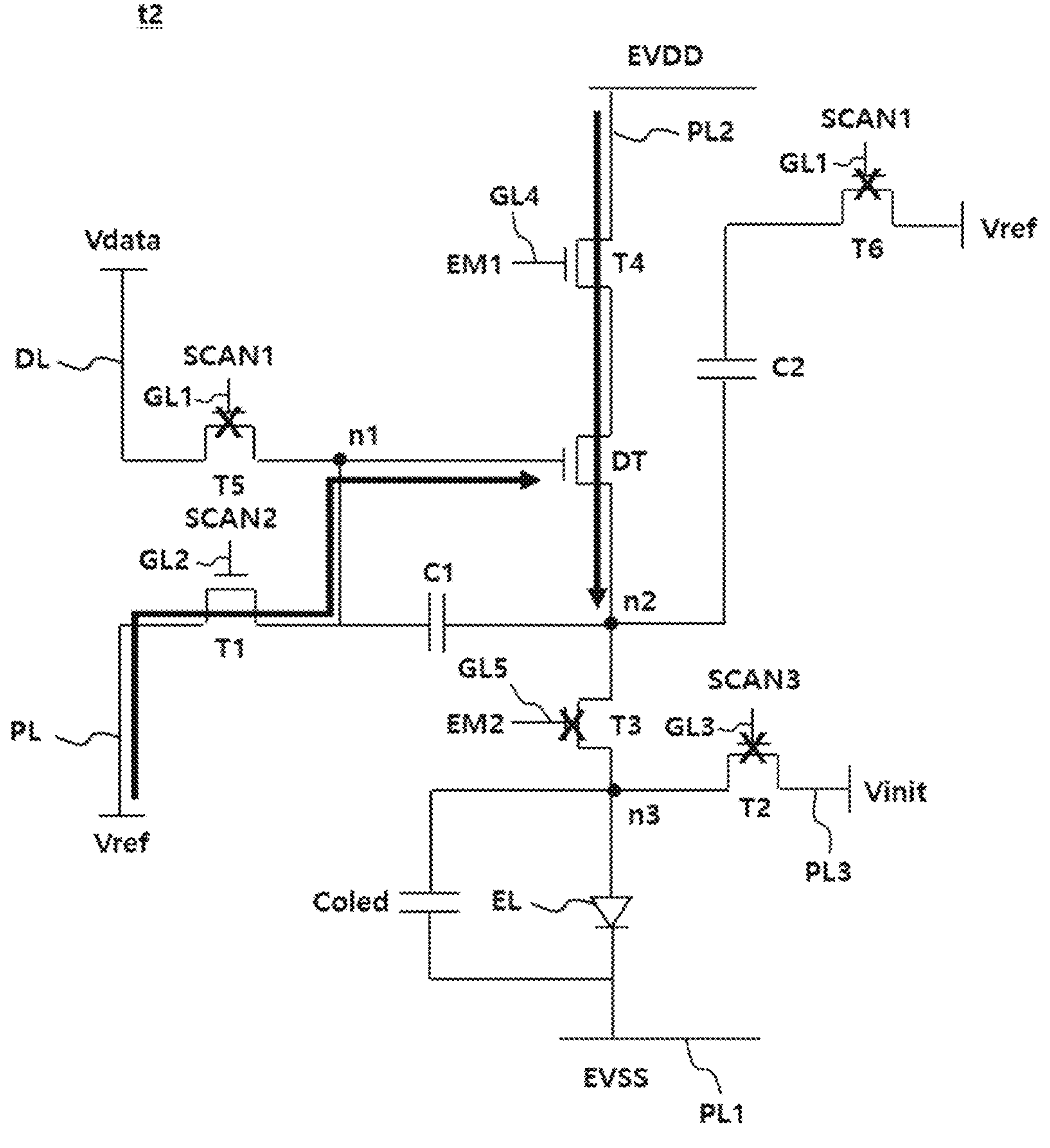
FIG. 33 is a diagram showing a sampling period operation of a pixel circuit illustrated in FIG. 30.
Figure 34:
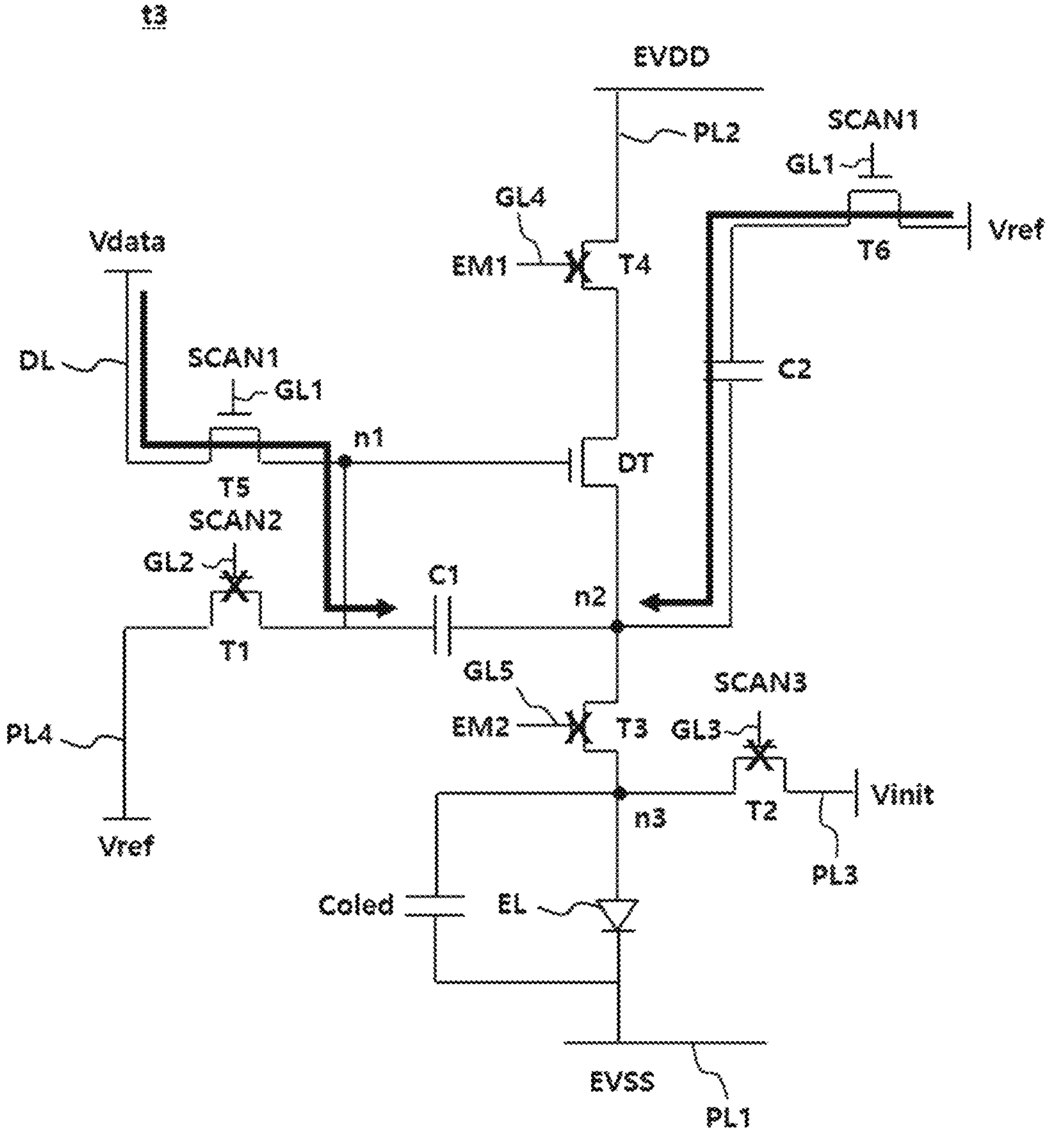
FIG. 34 is a diagram showing a data writing period operation of a pixel circuit illustrated in FIG. 30.
Figure 35:
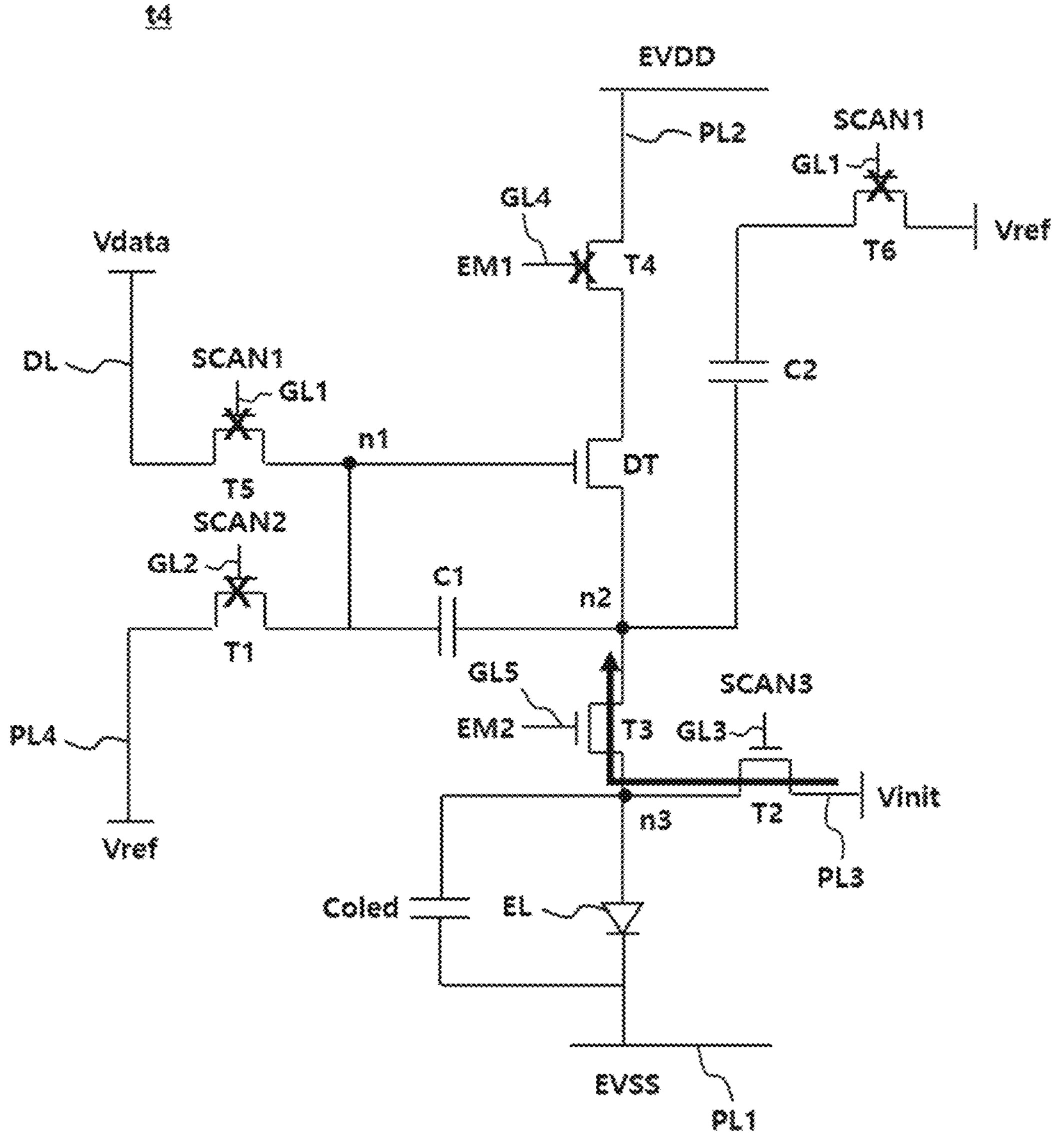
FIG. 35 is a diagram showing an anode reset period operation of a pixel circuit illustrated in FIG. 30.
Figure 36:
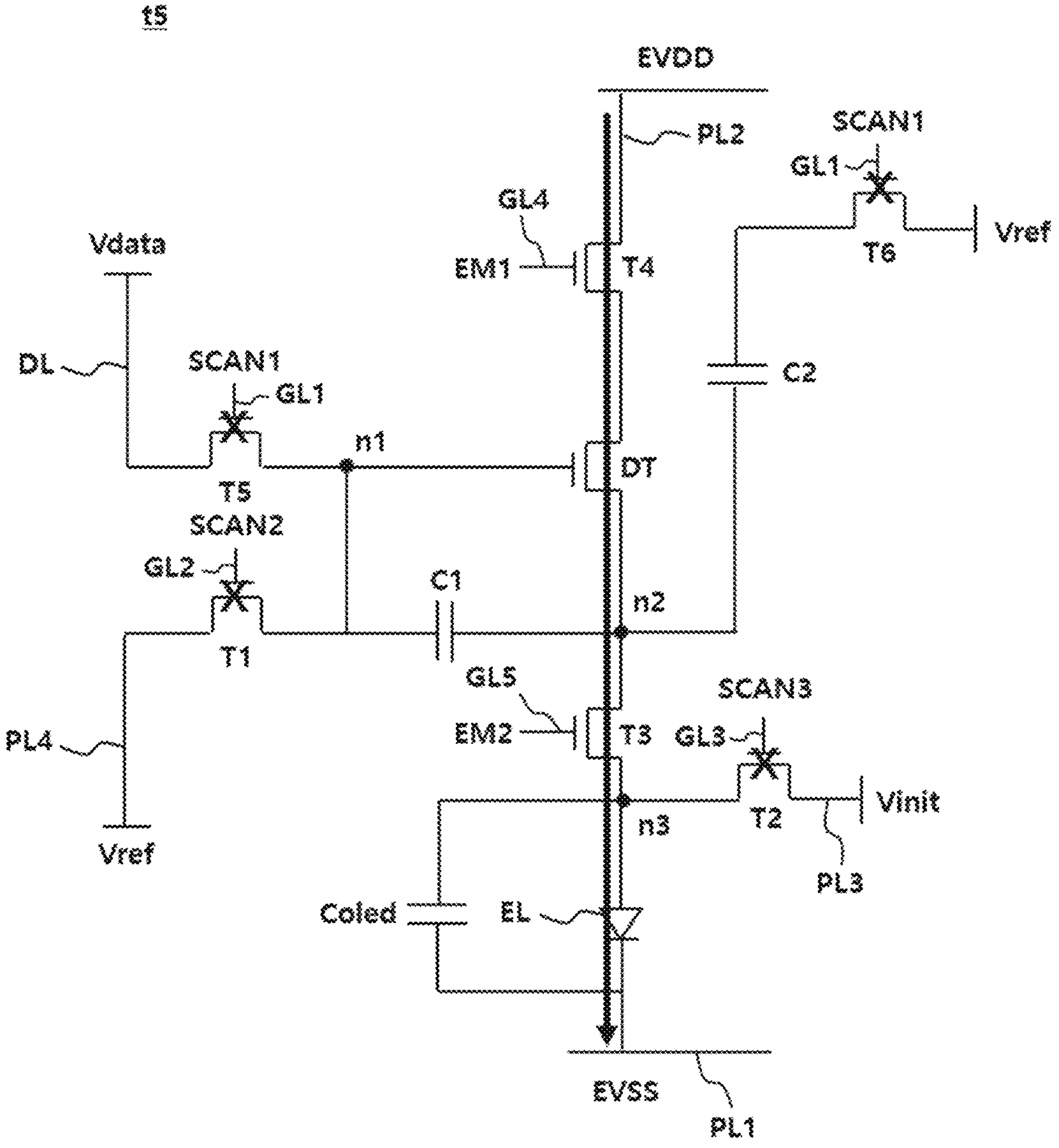
FIG. 36 is a diagram showing an emission period operation of a pixel circuit illustrated in FIG. 30.

FIG. 30 is a diagram exemplarily illustrating a configuration of a pixel circuit according to a third embodiment of the present disclosure.

Referring to FIG. 30, in a pixel circuit 3100 according to the third embodiment of the present disclosure, the second capacitor C2 is not connected to the second power line PL2. Further, a sixth switch element T6 is added to be able to apply the reference voltage Vref to the second capacitor C2.

Specifically, the first switch element T1 is turned on by the second gate signal SCAN2 in the initialization period t1, and the second switch element T2 and the third switch element T3 are turned on by the third gate signal SCAN3 and the fifth gate signal EM2. Due to this, the voltage of the first node n1 becomes the reference voltage Vref, and the voltage of the second node n2 becomes the initialization voltage Vinit.

The first switch element T1 maintains the turn-on by the second gate signal SCAN2 in the threshold voltage sensing period t2, and the fourth switch element T4 is turned on by the fourth gate signal EM1. Due to this, the voltage of the first node n1 maintains the reference voltage Vref, and the voltage of the second node n2 becomes a voltage (Vinit-Vth) obtained by subtracting the threshold voltage Vth of the driving element DT from the initialization voltage Vinit.

In the third embodiment of the present disclosure, since the second capacitor C2 is separated from the second power line PL2, it does not exert an influence on the threshold voltage sensing even if the pixel driving voltage EVDD is changed by the PWM driving of another pixel line in the threshold voltage sensing period t2. Accordingly, the mura does not occur.

Meanwhile, the fifth switch element T5 and the sixth switch element T6 are turned on by the first gate signal in the data writing period t3. Due to this, the voltage of the first node n1 becomes the data voltage Vdata.

The second switch element T2 is turned on by the third gate signal SCAN3 in the anode reset period t4. Due to this, the voltage of the second node n2 becomes the initialization voltage Vinit.

In the emission period t5, the fourth switch element T4 is turned on by the fourth gate signal EM1, and the fifth switch element T5 is turned on by the fifth gate signal EM2. Due to this, a current path is formed between the first power line Pl1 and the second power line Pl2, and the light-emitting element EL can emit light by the current flowing through the driving element DT.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

DESCRIPTION OF REFERENCE NUMERALS

100: Display panel
101: Pixel circuit
102: Data line
103: Gate line
110: Data driving circuit
120: Gate driving circuit
130: Timing controller
140: Power supply circuit
150: Level shifter
160: Voltage sensing circuit
3100: Pixel circuit

What is claimed is:

1. A method for compensating for mura in a display device, the method comprising:

displaying, on a display panel of the display device, frame data including high-grayscale line data and low-grayscale line data;

identifying a mura occurrence area in a first display area of the display panel on which the low-grayscale line data are displayed; and adjusting and inputting, to first pixel lines, a pulse width of a gate signal that is input to the first pixel lines included in the mura occurrence area in order to compensate for the mura of the mura occurrence area, wherein the mura occurrence area comprises a dark stripe area on which the mura is displayed with a luminance that is smaller than a luminance value of the low-grayscale line data, and wherein the adjusting comprises at least one of shortening the pulse width from a reference pulse width for the dark stripe area.

2. The method of claim 1, wherein in the displaying, the display device displays the high-grayscale line data on a second display area of the display panel, the second display area being different from the first display area.

3. The method of claim 2, wherein the display device performs pulse width modulation (PWM) driving of the first pixel lines included in the mura occurrence area and second pixel lines included in the second display area, and wherein in the identifying, the mura included in the mura occurrence area occurs due to the PWM driving of the second pixel lines, and includes dark stripes having a luminance value that is smaller than a luminance value of the low-grayscale line data and bright stripes having a luminance value that is larger than the luminance value of the low-grayscale line data.

4. The method of claim 1, wherein the mura occurrence area further comprises:

a normal area on which the mura is displayed with a same luminance as the luminance value of the low-grayscale line data, and a bright stripe area on which the mura is displayed with a luminance that is larger than the luminance value of the low-grayscale line data.

5. The method of claim 4, wherein in the inputting, the gate signal is a gate signal that determines a data writing period of the first pixel lines, and wherein the display device configures the pulse width of the gate signal to a reference pulse width, and inputs the configured pulse width of the gate signal to one or more pixel lines included in the normal area.

6. The method of claim 4, wherein in the inputting, the gate signal is a gate signal that determines a data writing period of the first pixel lines, and wherein the display device extends the pulse width of the gate signal beyond a reference pulse width, and inputs the extended pulse width of the gate signal to one or more pixel lines included in the bright stripe area.

7. The method of claim 1, wherein in the inputting, the gate signal is a gate signal that determines a data writing period of the first pixel lines, and wherein the display device shortens the pulse width of the gate signal from a reference pulse width, and inputs the shortened pulse width of the gate signal to one or more pixel lines included in the dark stripe area.

8. A display device for compensating for mura, the display device comprising:

a display panel including a plurality of pixel lines disposed in a gate line direction; and a display panel driver configured to write low-grayscale line data on first pixel lines included in a first display area of the display panel, write high-grayscale line data on second pixel lines included in a second display area of the display panel, and adjust a data writing period of the first pixel lines included in a mura occurrence area through identifying of the mura occurrence area in the first display area, wherein the mura occurrence area comprises a dark stripe area on which the mura is displayed with a luminance that is smaller than a luminance value of the low-grayscale line data, and wherein adjusting the data writing period comprises shortening the data writing period for the dark stripe area.

9. The display device of claim 8, wherein the display panel driver is configured to adjust and input, to the first pixel lines, a pulse width of a first gate signal that determines a data writing period of the first pixel lines.

10. The display device of claim 8, wherein the display panel driver comprises:

a gate driving circuit configured to output a plurality of gate signals to the first pixel lines and the second pixel lines, and adjust and output, to the first pixel lines, a pulse width of a first gate signal that determines a data writing period of the first pixel lines; and a data driving circuit configured to write the low-grayscale line data on respective first pixel lines, and write the high-grayscale line data on the respective second pixel lines.

11. The display device of claim 10, wherein the mura occurrence area further comprises:

a normal area on which the mura is displayed with a same luminance as the luminance value of the low-grayscale line data, and a bright stripe area on which the mura is displayed with a luminance that is larger than the luminance value of the low-grayscale line data.

12. The display device of claim 11, wherein the first pixel line is included in the bright stripe area, and wherein the gate driving circuit is configured to extend the pulse width of the first gate signal beyond a reference pulse width, and output the extended pulse width of the first gate signal to the first pixel line.

13. The display device of claim 10, wherein the first pixel line is included in the dark stripe area, and wherein the gate driving circuit is configured to shorten the pulse width of the first gate signal from a reference pulse width, and output the shortened pulse width of the first gate signal to the first pixel line.

14. The display device of claim 10, wherein the gate driving circuit is configured to output a second gate signal for pulse width modulation (PWM) driving to the first pixel lines and the second pixel lines, and wherein the mura included in the mura occurrence area occurs by the PWM driving of the second pixel lines.

15. A method for compensating for mura in a display device, the method comprising:

displaying, on a display panel of the display device, frame data including high-grayscale line data and low-grayscale line data;

identifying a mura occurrence area in a first display area of the display panel on which the low-grayscale line data are displayed; and adjusting and inputting, to first pixel lines, a pulse width of a gate signal that is input to the first pixel lines included in the mura occurrence area in order to compensate for the mura of the mura occurrence area, wherein the adjusting comprises at least one of shortening the pulse width from a reference pulse width in response to the mura occurrence area including a dark stripe area or extending the pulse width from the reference pulse width in response to the mura occurrence area including a bright stripe area.

* * * * *